United States Patent
Suzuki et al.

(10) Patent No.: US 10,836,932 B2
(45) Date of Patent: Nov. 17, 2020

(54) PRESSURE-SENSITIVE ADHESIVE SHEET AND RELEASE FILM-SUPPORTED PRESSURE-SENSITIVE ADHESIVE SHEET

(71) Applicant: NITTO DENKO CORPORATION, Ibaraki (JP)

(72) Inventors: Tatsuya Suzuki, Ibaraki (JP); Kiyoe Shigetomi, Ibaraki (JP); Junichi Nakayama, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 179 days.

(21) Appl. No.: 15/355,625

(22) Filed: Nov. 18, 2016

(65) Prior Publication Data

US 2017/0152412 A1    Jun. 1, 2017

(30) Foreign Application Priority Data

Nov. 27, 2015 (JP) .................................. 2015-232149
Jul. 14, 2016 (JP) .................................. 2016-139538

(51) Int. Cl.
- *C09J 7/10* (2018.01)
- *C09J 7/38* (2018.01)
- *C09J 7/40* (2018.01)
- *C09J 133/08* (2006.01)

(52) U.S. Cl.
CPC ................. *C09J 7/10* (2018.01); *C09J 7/385* (2018.01); *C09J 7/403* (2018.01); *C09J 133/08* (2013.01); *C09J 2433/00* (2013.01)

(58) Field of Classification Search
CPC ..... C09J 133/08; C09J 133/10; C09J 2433/00
See application file for complete search history.

(56) References Cited

U.S. PATENT DOCUMENTS

| | | | |
|---|---|---|---|
| 6,908,671 B2 * | 6/2005 | Hosokawa | C09J 11/04 428/355 AC |
| 7,198,831 B2 * | 4/2007 | Watanabe | G02F 1/133526 349/112 |
| 8,999,455 B2 * | 4/2015 | Araki | C09J 4/00 427/508 |
| 2007/0254136 A1 * | 11/2007 | Kato | C09J 7/20 428/131 |

(Continued)

FOREIGN PATENT DOCUMENTS

| CN | 1946821 A | 4/2007 |
|---|---|---|
| CN | 102482536 A | 5/2012 |

(Continued)

OTHER PUBLICATIONS

Extended European Search Report dated May 2, 2017, from the European Patent Office in counterpart European Application No. 16200127.5.

(Continued)

*Primary Examiner* — Scott R. Walshon
(74) *Attorney, Agent, or Firm* — Sughrue Mion, PLLC

(57) ABSTRACT

Provided is a PSA sheet having a PSA layer. The PSA sheet has a first face and a second face. The first face is a first adhesive face formed of one surface of the PSA layer. The first adhesive face has a 10-point mean roughness of 1000 nm or less. The PSA layer has a storage modulus of 0.08 MPa or greater at 100° C.

16 Claims, 1 Drawing Sheet

(56) References Cited

U.S. PATENT DOCUMENTS

| | | | |
|---|---|---|---|
| 2011/0189835 A1* | 8/2011 | Sugo | B32B 7/12 438/464 |
| 2012/0171483 A1 | 7/2012 | Klier et al. | |
| 2012/0328864 A1 | 12/2012 | Takarada et al. | |
| 2013/0295329 A1* | 11/2013 | Araki | C08F 220/18 428/143 |
| 2014/0044961 A1 | 2/2014 | Takami et al. | |
| 2014/0178622 A1 | 6/2014 | Fuchi et al. | |
| 2016/0237319 A1* | 8/2016 | Takarada | C09J 7/0217 |
| 2016/0369136 A1 | 12/2016 | Suzuki et al. | |

FOREIGN PATENT DOCUMENTS

| | | |
|---|---|---|
| CN | 102838941 A | 12/2012 |
| CN | 103857760 A | 6/2014 |
| CN | 104073177 A | 10/2014 |
| CN | 106256840 A | 12/2016 |
| EP | 2 537 903 A2 | 12/2012 |
| EP | 2 740 777 A1 | 6/2014 |
| EP | 3 106 498 A1 | 12/2016 |
| JP | 2009-124133 A | 6/2009 |
| JP | 2010-229246 A | 10/2010 |
| JP | 2012-531498 A | 12/2012 |
| JP | 2013-6892 A | 1/2013 |
| JP | 2014-34655 A | 2/2014 |
| JP | 2014-189778 A | 10/2014 |
| JP | 2015-13909 A | 1/2015 |
| WO | WO-2008149890 A1 * 12/2008 | ............... B32B 7/12 |
| WO | 2013/018602 A1 | 2/2013 |
| WO | 2014/156335 A1 | 10/2014 |

OTHER PUBLICATIONS

Communication dated Oct. 7, 2019 issued by the European Patent Office in counterpart European Application No. 16200127.5.

Notice of Reasons for Refusal dated Mar. 19, 2020 in Japanese Application No. 2016-139538.

Notice of Reasons for Refusal dated Jun. 4, 2020 in Japanese Application No. 2016-139538.

Office Action dated May 6, 2020 in Taiwanese Application No. 105138382.

First Office Action dated May 29, 2020, from the State Intellectual Property office of the P.R.C in application No. 201611050511.X.

* cited by examiner

PRESSURE-SENSITIVE ADHESIVE SHEET AND RELEASE FILM-SUPPORTED PRESSURE-SENSITIVE ADHESIVE SHEET

CROSS-REFERENCE

The present application claims priority to Japanese Patent Application No. 2015-232149 filed on Nov. 27, 2015 and Japanese Patent Application No. 2016-139538 filed on Jul. 14, 2016; and the entire contents of these applications are incorporated herein by reference.

BACKGROUND OF THE INVENTION

1. Field of the Invention

The present invention relates to a pressure-sensitive adhesive sheet and a release film-supported pressure-sensitive adhesive sheet.

2. Description of the Related Art

In general, pressure-sensitive adhesive (PSA) exists as a soft solid (a viscoelastic material) in a room temperature range and has a property to adhere easily to an adherend with some pressure applied. For such a property, PSA has been widely used in various industrial fields from home appliances to automobiles, OA equipment, and so on, typically in a form of a PSA sheet comprising a layer of the PSA.

For some PSA sheets, highly smooth adhesive faces (surfaces of PSA layers) are required. An example of such PSA sheets is a PSA sheet for optical applications. Japanese Patent Application Publication No. 2014-189778 is cited as a technical literature about preventing formation of irregularities in a PSA layer surface. WO 2014/156335 is a technical literature about a double-faced PSA sheet having a release film with a highly smooth surface.

SUMMARY OF THE INVENTION

In general, from the standpoint of the convenience of distribution, productivity, etc., a PSA sheet (particularly an industrial PSA sheet) is often produced in a form of long PSA tape wound in a roll or in a form of flat sheet having a relatively large surface area. The PSA sheet can be then subjected to various processes or treatments before it is finally applied to individual adherends. Examples of such processes or treatments include a process to shape the PSA sheet to suit a certain shape of adherend by punching, cutting, etc.; a treatment to prepare the PSA sheet into a form suited for increasing the efficiency and accuracy of its application to an adherend; and the like.

During such a process or treatment, release film that protects the adhesive face of the PSA sheet is replaced in some cases. In other words, one release film is sometimes removed from the adhesive face of the PSA sheet; and to the exposed adhesive face, a release face of another of release film is adhered. Thus, the release film on the adhesive face of the PSA sheet just before applied to an adherend can be different from the original release film placed on the adhesive face when the PSA sheet was produced. With the today's trends surrounding optical products towards greater diversity, downsizing, larger displays and greater design complexity, there tends to be more instances and needs to replace the release film on the adhesive face before the PSA sheet is applied to the adherend. However, because PSA is viscoelastic as described earlier, even if the PSA sheet is originally manufactured to have a highly smooth adhesive face, it may suffer roughening (some loss of smoothness) depending on how it is handled afterwards. For instance, when the release film protecting the highly smooth adhesive face is replaced with another release film, the adhesive face may be roughened depending on the replacement film.

An objective of the present invention is thus to provide a PSA sheet that has a highly smooth adhesive face and is less susceptible to roughening of the adhesive face. Another related objective is to provide a release film-supported PSA sheet having a release film on an adhesive face of such a PSA sheet.

With respect to PSA sheets having highly smooth adhesive faces, the inventors have looked into the 100° C. storage moduli (storage moduli at 100° C.) of the PSA layers constituting the highly smooth adhesive faces and have found that the problem could be solved, whereby the present invention has been completed.

This description provides a PSA sheet comprising a PSA layer. The PSA sheet has a first face and a second face. The first face is a first adhesive face formed of a first surface of the PSA layer. The first adhesive face has a ten-point mean roughness ($Rz_{A1}$) of about 1000 nm or less. The PSA layer has a 100° C. storage modulus ($G'_{100}$) of about 0.08 MPa or greater. Such a PSA sheet has a highly smooth first adhesive face and the PSA layer constituting the first adhesive face has a high $G'_{100}$ value; and therefore, it tends to be less susceptible to roughening of the first adhesive face. Accordingly, the PSA sheet is suitable for an application (e.g. an optical application) that prefers a highly smooth adhesive face.

In an embodiment of the art disclosed herein, the PSA layer's 100° C. storage modulus ($G'_{100}$) is greater by about 35% or more than the 23° C. storage modulus (storage modulus at 23° C., $G'_{23}$) of the PSA layer. In other words, the 100° C./23° C. storage modulus ratio ($G'_{100}/G'_{23}$) is about 35% or higher. According to the PSA sheet having such a PSA layer, an ability to maintain the smoothness of the first adhesive face tends to be preferably combined with workability during its application at room temperature. The upper limit of $G'_{100}/G'_{23}$ is not particularly limited, but is usually about 100% or less.

In an embodiment of the art disclosed herein, the PSA layer's 23° C. storage modulus ($G'_{23}$) is less than about 0.30 MPa. The PSA sheet having such a PSA layer tends to show great initial adhesion at room temperature.

In an embodiment of the art disclosed herein, in the PSA sheet, the second face is a second adhesive face. That is, the PSA sheet in this embodiment is constructed as an adhesively double-faced PSA sheet in which the first and second faces are both adhesive faces. Such a double-faced PSA sheet can be preferably used, for instance, for joining or fastening components, etc. In an embodiment, the second adhesive face may have a 10-point mean roughness ($Rz_{A2}$) of about 2000 nm or less (preferably about 1000 nm or less). The double-faced PSA sheet having such a second adhesive face is suitable for an application that prefers a highly smooth adhesive face.

In an embodiment of the art disclosed herein, the second face can be a second adhesive face formed of a second surface of the PSA layer. That is, the first and second surfaces of the PSA layer form the first and second adhesive faces of the PSA sheet, respectively. The PSA sheet in this embodiment has a simple structure and thus is suitable for increasing optical properties (e.g. transparency). In an embodiment, the 10-point mean roughness ($Rz_{A2}$) of the second adhesive face can be about 2000 nm or less (e.g. about 1000 nm or less). Such a PSA sheet has a highly smooth second adhesive face and the PSA layer constituting the second adhesive face has a high $G'_{100}$ value; and therefore, it tends to be less susceptible to roughening of the second adhesive face. Accordingly, it is suitable for an application that prefers a highly smooth adhesive face.

This description also provides a release film-supported PSA sheet comprising a PSA sheet disclosed herein and a first release film placed on the first adhesive face of the PSA sheet. The PSA sheet constituting such a release film-supported PSA sheet can be preferably used in an embodiment where it is adhered to an adherend after desirable replacement (exchange) of the first release film with another release film.

In the release film-supported PSA sheet having the first release film on the first adhesive face, it is preferable that the first release film has a release face in contact with the first adhesive face, with the release face having a 10-point mean roughness ($Rz_{R1}$) different by 250 nm or less from the 10-point mean roughness ($Rz_{A1}$) of the first adhesive face. That is, $|Rz_{R1}-Rz_{A1}|$ is preferably 250 nm or less. Such a release film-supported PSA sheet tends to have excellent external appearance because the release face of the first release film and the first adhesive face are tightly fitted. Hereinafter, the release face in contact with the first adhesive face is sometimes called the "first release face." The release face in contact with the second adhesive face is sometimes called the "second release face."

This description also provides a release film-supported PSA sheet comprising any of the double-faced PSA sheet disclosed herein, a first release film placed on the first adhesive face of the PSA sheet and a second release film placed on the second adhesive face of the PSA sheet. The double-faced PSA sheet constituting such a release film-supported PSA sheet can be preferably used in an embodiment where it is adhered to an adherend after desirable replacement of one or each of the first release film and the second release film with another release film.

In a preferable embodiment of the release film-supported PSA sheet comprising the double-faced PSA sheet, the first release film and the second release film as described above (i.e. the release film-supported double-faced PSA sheet), the first release face of the first release film may have a 10-point mean roughness ($Rz_{R1}$) different by 250 nm or less from the 10-point mean roughness ($Rz_{A1}$) of the first adhesive face; and the second release face of the second release film may have a 10-point mean roughness ($Rz_{R2}$) different by 250 nm or less from the 10-point mean roughness ($Rz_{A2}$) of the second adhesive face. In other words, each of $|Rz_{R1}-Rz_{A1}|$ and $|Rz_{R2}-Rz_{A2}|$ can be 250 nm or less. The release film-supported PSA sheet in such an embodiment tends to have excellent external appearance because the release faces of the first and second release films are tightly fitted with the first and second adhesive faces, respectively.

DETAILED DESCRIPTION OF THE INVENTION

Figure 1:
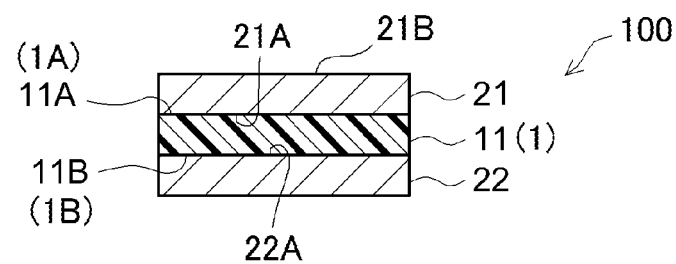
FIG. 1 shows a schematic cross-sectional view of a release film-supported PSA sheet comprising the PSA sheet (a substrate-free double-faced PSA sheet) according to an embodiment.

Preferred embodiments of the present invention are described below. Matters necessary to practice this invention other than those specifically referred to in this description can be understood by a person skilled in the art based on the disclosure about implementing the invention in this description and common general knowledge at the time of application. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate size or reduction scale of an actual product provided.

As used herein, the term "PSA" refers to, as described earlier, a material that exists as a soft solid (a viscoelastic material) in a room temperature range and has a property to adhere easily to an adherend with some pressure applied. As defined in "Adhesion Fundamental and Practice" by C. A. Dahlquist (McLaren & Sons (1966), P. 143), PSA referred to herein may be a material that has a property satisfying complex tensile modulus $E^*(1\ Hz)<10^7$ dyne/cm$^2$ (typically, a material that exhibits the described characteristics at 25° C.).

In this description, the term "adhesive face" refers to a surface that has a peel strength of 0.1 N/20 mm or greater when determined in a measurement environment at 23° C. based on JIS Z0237(2004), by press-bonding it to a SUS304 stainless steel plate as the adherend with a 2 kg roller moved back and forth once and then, after 30 minutes, peeling it in the 180° direction at a tensile speed of 300 mm/min. In this description, the term "non-adhesive face" refers to a surface that is not included in the adhesive face. It typically refers to a surface having a peel strength of less than 0.1 N/20 mm. A typical example included in the concept of non-adhesive face herein is a surface that when it is press-bonded to a SUS304 stainless steel plate with a 2 kg roller moved back and forth once, it does not adhere to the stainless steel plate (it shows essentially no adhesiveness).

<PSA Sheet>

The PSA sheet disclosed herein is formed as a sheet (meaning to include a long continuous form such as tape, etc.) having a first face and a second face. The PSA sheet comprises at least a PSA layer. The PSA sheet disclosed herein may be formed of the PSA layer solely or may be formed with the inclusion of a component other than the PSA layer.

The first face of the PSA sheet disclosed herein is an adhesive face (first adhesive face) formed of one surface of the PSA layer. The second face of the PSA sheet can be an adhesive face or a non-adhesive face. The PSA sheet according to an embodiment, the second face of the PSA sheet is an adhesive face (second adhesive face) formed of the other surface of the PSA layer. In other words, the first and second surfaces of a single PSA layer form the first and second adhesive faces of the PSA sheet, respectively. FIG. 1 shows an example of the construction of the PSA sheet in this embodiment.

A PSA sheet 1 shown in FIG. 1 is a substrate-free double-faced PSA sheet formed of a PSA layer 11. The first face 1A of the PSA sheet 1 is the first adhesive face formed of the first surface 11A of the PSA layer 11. The second face 1B of the PSA sheet 1 is the second adhesive face formed of the second surface 11B of the PSA layer 11. PSA layer 11 may have a single-layer structure or a multi-layer structure including two or more PSA sublayers. The respective PSA sublayers constituting the multi-layer structure may be identical or different in construction (material, thickness, etc.). From the standpoint of the productivity and transparency, an embodiment where the PSA layer 11 has a single-layer structure can be preferably used.

Herein, the substrate-free double-faced PSA sheet refers to a double-faced PSA sheet that does not include a non-releasable support substrate between the first and second adhesive faces. The support substrate refers to a substrate capable of holding its shape by itself. The non-releasable support substrate refers to a support substrate that is not to be separated from the PSA layer while the PSA sheet comprising the support substrate is in use.

Prior to use (i.e. before adhered to an adherend), PSA sheet 1 may be, for instance, as shown in FIG. 1, in a form where the first adhesive face 1A and second adhesive face 1B are protected with a first release film 21 and a second release film 22, respectively. The first release film 21 has a surface 21A in contact with the first adhesive face 11A and the second release film 22 has a surface 22A in contact with the second adhesive face 11B, with each of the surfaces 21A and 22A being a release face (releasable surface, i.e. a surface that allows release of the PSA layer from itself). PSA sheet 1 in such an embodiment can also be thought as a component of a release film-supported PSA sheet (release film-supported double-faced PSA sheet) 100 that comprises the PSA sheet 1, the first release film 21 placed with its one surface (first release face) 21A being in contact with the first adhesive face 11A, and the second release film 22 placed with its one surface (second release face) 22A being in contact with the second adhesive face 12A. The release film-supported PSA sheet 100 may be wound in a roll. In another embodiment of the PSA sheet 1 prior to use, for instance, the release film 22 in FIG. 1 is omitted; and the PSA sheet 1 is layered with release film 21 whose front face 21A and back face 21B are both release faces, and wound in a roll so that the second adhesive face 11B makes contact with the back face 21B of release film 21.

Figure 2:
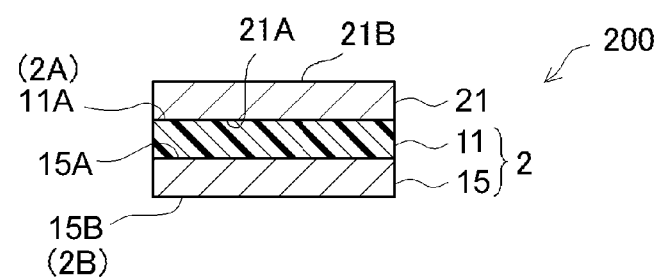
FIG. 2 shows a schematic cross-sectional view of a release film-supported PSA sheet comprising the PSA sheet (a substrate-supported single-faced PSA sheet) according to another embodiment.

FIG. 2 shows a construction example of the PSA sheet where its second face is a non-adhesive face. A PSA sheet 2 shown in FIG. 2 is constructed as a substrate-supported single-faced PSA sheet that comprises a support substrate 15 having a first face 15A and a PSA layer 11 placed on the first face 15A of the support substrate 15. Herein, the first face 15A of support substrate 15 is a non-releasable surface, that is, a non-releasable face. The first face 2A of PSA sheet 2 is the first adhesive face formed of one surface 11A of PSA layer 11. The second face 2B of PSA sheet 2 is a non-adhesive face formed of the second face 15B of support substrate 15. The second face 15B can be a release face or a non-release face.

For instance, as shown in FIG. 2, PSA sheet 2 prior to use may be in a form where the first adhesive face 11A is protected with the first release film 21. PSA sheet 2 in such a form can be thought as a component of a release film-supported PSA sheet (release film-supported single-faced PSA sheet) 200 that comprises the PSA sheet 2 and the first release film 21 placed so that its surface (first release face) 21A makes contact with the first adhesive face 11A. Release film-supported PSA sheet 200 may be wound in a roll.

Another construction example of the PSA sheet is that of a substrate-supported double-faced PSA sheet comprising a support substrate whose first and second faces are both non-releasable and having a first PSA layer on the first face of the support substrate and a second PSA layer on the second face of the support substrate. In such a substrate-supported double-faced PSA sheet, its first face is the first adhesive face formed of a surface of the first PSA layer and its second face is the second adhesive face formed of a surface of the second PSA layer. The first PSA layer and the second PSA layer may have the same composition and construction, or differ in either or both of composition and construction. An example of the embodiment where the first and second PSA layers have the same composition, but different constructions is an embodiment where the first and second PSA layers are formed from the same PSA composition in different thicknesses. The first and second PSA layers may independently have a single-layer structure or a multi-layer structure including two or more PSA sublayers. From the productivity and transparency, an embodiment where both the first and second PSA layers have single-layer structures can be preferably used.

Similarly to the substrate-free double-faced PSA sheet shown in FIG. 1, the substrate-supported double-faced PSA sheet prior to use may be in an embodiment where the first adhesive face (one surface of the first PSA layer) and the second adhesive face are protected with the first and second release films, respectively. The substrate-supported double-faced PSA sheet in such an embodiment can be thought as a component of a release film-supported PSA sheet that comprises the PSA sheet, first release film and second release film. Such a release film-supported PSA sheet may be wound in a roll. Prior to use, the substrate-supported double-faced PSA sheet can be in an embodiment where a release film having a release face on each side and the PSA sheet are layered and wound in a roll.

The material of the support substrate is not particularly limited in the PSA sheet in an embodiment of the substrate-supported single-faced PSA sheet or substrate-supported double-faced PSA sheet. As the support substrate, for instance, plastic film, paper, woven fabrics, non-woven fabrics, rubber sheets, foam sheets, metal foil, glass and a composite of these can be used. The surface of the support substrate on which the PSA layer is placed can be subjected to a surface treatment such as primer coating, corona discharge treatment, plasma treatment, etc. In this description, the plastic film is typically a non-porous sheet and is conceptually distinct from the non-woven fabric (i.e. conceptually excludes the non-woven fabric).

In an embodiment, for the likelihood of making the first adhesive face highly smooth, etc., various types of plastic film can be preferably used as the support substrate. Examples of the plastic film material include polyester-based resins such as polyethylene terephthalate, polyethylene naphthalate, etc.; cellulose-based resins such as triacetyl cellulose, etc.; acetate-based resins; polysulfone-based resins; polyether sulfone-based resins; polycarbonate-based resins; polyamide-based resins; polyimide-based resins; polyolefinic resins; cyclic polyolefinic resins (such as norbornene-based resins); (meth)acrylic resins; polyvinyl chloride-based resins; polyvinylidene chloride-based resins; polystyrene-based resins; polyvinyl alcohol-based resins; polyarylate-based resins; polyphenylene sulfide-based resins; a mixture of these; and the like. Particularly preferable materials include polyester-based resins, cellulose-based resins, polyimide-based resins and polyether sulfone-based resins. To the plastic film used for the support substrate, a known additive may be added, similarly to the plastic film for the release film substrate described later. The plastic film is preferably transparent.

The thickness of the support substrate is not particularly limited and can be suitably selected in accordance with the purpose. In an embodiment, the support substrate has a thickness of about 10 µm to about 500 µm, or usually suitably about 10 µm to about 300 µm. In an embodiment, a support substrate (e.g. the transparent plastic film) having a thickness of about 15 μm to about 200 μm can be preferably used.

(10-Point Mean Roughness)

The PSA sheet disclosed herein preferably has a 10-point mean roughness ($Rz_{A1}$) of first adhesive face of about 1000 nm or less. The PSA sheet having such a first adhesive face is preferable for an application that prefers a highly smooth adhesive face. For example, it can be preferably used in an embodiment where the first adhesive face is adhered to an optical part. From the standpoint of providing a smoother adhesive face, $Rz_{A1}$ is preferably about 700 nm or less, more preferably about 500 nm or less, or yet more preferably about 300 nm or less (e.g. about 200 nm or less). The lower limit of $Rz_{A1}$ is not particularly limited. In an embodiment, $Rz_{A1}$ can be about 30 nm or greater (e.g. about 50 nm or greater).

Herein, the 10-point mean roughness in this description refers to a 10-point mean roughness value obtained, using a non-contact surface roughness analyzer unless otherwise noted. As the non-contact surface roughness analyzer, an optical interferometric surface roughness analyzer is used. As for a specific analyzer, Wyko NT-9100 available from Veeco or an equivalent product can be used. Specific operations and conditions of the measurement can be set according to the measurement conditions described later in the working examples or to obtain data equivalent or comparable to data obtained according to the measurement conditions. In the roughness curve obtained by the surface roughness measurement, the altitudes (Yp1 to Yp10) of the ten highest peaks and the altitudes (Yv1 to Yv10) of the ten lowest valleys are measured at their bottoms; and the 10-point mean roughness is determined as the mean of the absolute values of the respective differences between Yp1 to Yp10 and Yv1 to Yv10.

When the PSA sheet disclosed herein is in an embodiment of the double-faced PSA sheet (i.e. a PSA sheet having the first and second adhesive faces), the 10-point mean roughness ($Rz_{A2}$) of the second adhesive face is not particularly limited. In a preferable embodiment, $Rz_{A2}$ can be about 2000 nm or less (typically about 1000 nm or less, preferably about 700 nm or less, more preferably about 500 nm or less, or yet more preferably about 300 nm or less, e.g. about 200 nm or less). The lower limit of $Rz_{A2}$ is not particularly limited. In an embodiment, $Rz_{A2}$ can be about 30 nm or greater (e.g. about 50 nm or greater). The second adhesive face can be the other surface of the PSA layer that constitutes the first adhesive face, or a surface of another PSA layer different from the PSA layer that constitutes the first adhesive face.

(Storage Modulus)

In the PSA sheet disclosed herein, the PSA layer that constitutes the first adhesive face has a 100° C. storage modulus ($G'_{100}$) of about 0.08 MPa or greater. The PSA sheet having such a PSA layer is less susceptible to roughening of the first adhesive face after its production. For instance, after the production of the PSA sheet, even if the release film on the first adhesive face is replaced with a less smooth piece before it is applied to an adherend, roughening of the first adhesive face tends to be inhibited. This may be that once the PSA sheet has been produced, after the release film is replaced (exchanged), the PSA layer deforms at a low rate; and given this, by the 100° C. storage modulus of the PSA layer, the behavior of the PSA layer cam be suitably analyzed in relation to the low-rate plastic deformation (time-temperature superposition principle); and with the 100° C. storage modulus being at or above the prescribed value, the PSA sheet with its first adhesive face being less susceptible to roughening caused by replacement of the release film can be realized efficiently.

In the art disclosed herein, $G'_{100}$ can be about 0.09 MPa or greater, about 0.10 MPa or greater, or even about 0.11 MPa or greater (e.g. about 0.12 MPa or greater). With increasing $G'_{100}$, the smoothness of the first adhesive face tends to be preserved better. The upper limit of $G'_{100}$ can be, but not particularly limited to, for instance, about 1.5 MPa or less (typically about 1.0 MPa or less). From the standpoint of the adhesion to an adherend, etc., $G'_{100}$ is usually suitably less than about 0.50 MPa, preferably less than about 0.40 MPa, or more preferably less than about 0.30 MPa. $G'_{100}$ can be adjusted by the PSA layer's composition (e.g. the composition, molecular weight, state of crosslinking and crosslink density of the polymer in the PSA layer; use or absence of an additive and the amount used if any), production method, etc.

In an embodiment of the art disclosed herein, the PSA layer constituting the first adhesive face of the PSA sheet has a 23° C. storage modulus ($G'_{23}$) of less than about 0.30 MPa. The PSA sheet having such a PSA layer tends to show great initial adhesiveness to an adherend at room temperature. This is preferable from the standpoint of the workability (efficiency, accuracy) during the application of the PSA sheet, etc. In an embodiment, $G'_{23}$ is about 0.29 MPa or less, about 0.27 MPa or less, or even about 0.25 MPa or less. With decreasing $G'_{23}$, the adhesiveness of the PSA sheet tends to increase. The lower limit of $G'_{23}$ is not particularly limited. For instance, it can be about 0.05 MPa or greater. From the standpoint of facilitating to combine it with the $G'_{100}$ equal to or above the prescribed level, $G'_{23}$ is usually suitably about 0.08 MPa or greater, preferably about 0.10 MPa or greater, or more preferably about 0.15 MPa or greater (e.g. about 0.17 MPa or greater). $G'_{23}$ can be adjusted by the PSA layer's composition, production method, and so on.

In the art disclosed herein, as the 100° C. storage modulus ($G'_{100}$) and 23° C. storage modulus ($G'_{23}$) of a PSA layer, the values of storage moduli at 100° C. and 23° C. determined by dynamic viscoelasticity measurement of the PSA constituting the PSA layer can be used. As a specific measurement system, ARES available from TA Instruments or an equivalent product can be used. Specific operations and conditions of the measurement can be set according to the measurement conditions described later in the working examples or to obtain data equivalent or comparable to data obtained according to the measurement conditions.

The art disclosed herein can be preferably implemented in an embodiment where the PSA layer constituting the first adhesive face has a 100° C./23° C. storage modulus ratio ($G'_{100}/G'_{23}$) of greater than about 30% (e.g. about 31% or greater). From the standpoint of more preferably combining the ability to maintain the smoothness of the first adhesive face and workability during the application, $G'_{100}/G'_{23}$ can be about 35% or greater, about 40% or greater, or even about 50% or greater (e.g. about 55% or greater). The upper limit of $G'_{100}/G'_{23}$ is, but not particularly limited to, usually about 100% or less, or typically less than about 100%. From the standpoint of increasing the workability during its application at room temperature, $G'_{100}/G'_{23}$ can be about 90% or less or even about 80% or less (e.g. about 70% or less). In an embodiment, $G'_{100}/G'_{23}$ can be about 35% to about 50%. Such a PSA layer tends to readily form a highly smooth first adhesive face.

In an embodiment of the art disclosed herein, the PSA layer constituting the first adhesive face has a ratio of its 100° C. storage modulus ($G'_{100}$) to its thickness ($T_{A1}$) of about 9 MPa/mm or less. A PSA sheet comprising the PSA layer whose $G'_{100}/T_{A1}$ is at or below the prescribed value such as this is preferable because it shows adequately tight adhesion in long term as compared with a PSA layer having a larger $G'_{100}/T_{A1}$ value. For example, with the PSA layer having a $G'_{100}$ of about 0.08 MPa or greater (typically about 0.08 MPa or greater, but less than about 0.50 MPa) and a $G'_{100}/T_{A1}$ of about 9 MPa/mm or less, even if the release film on the first adhesive face is replaced with a less smooth release film, the first adhesive face can be less likely to be roughened, bringing about a PSA sheet with excellent long-term tight adhesion to an adherend. From the standpoint of obtaining better effects, in an embodiment, $G'_{100}/T_{A1}$ can be about 7.0 MPa/mm or less. The art disclosed herein can be preferably implemented, for instance, in an embodiment where $G'_{100}/T_{A1}$ is about 5.0 MPa/mm or less (e.g. about 3.0 MPa/mm or less). The lower limit of $G'_{100}/T_{A1}$ is usually suitably, but not particularly limited to, about 0.1 MPa/mm or greater.

In the art disclosed herein, the thickness ($T_{A1}$) of the PSA layer constituting the first adhesive face is not particularly limited. $T_{A1}$ can be, for instance, about 1 μm to about 500 μm (typically about 1 μm to about 250 μm). In an embodiment, $T_{A1}$ can be about 5 μm or greater, or about 15 μm or greater. With increasing $T_{A1}$, roughening of the first adhesive face tends to be likely to progress upon replacement of the release film on the first adhesive face with a less smooth piece. Thus, it will be more significant to inhibit roughening of the first adhesive face by applying the art disclosed herein. From such a standpoint, the art disclosed herein can be preferably implemented in an embodiment where $T_{A1}$ is greater than about 20 μm (more preferably about 25 μm or greater, yet more preferably about 30 μm or greater, e.g. about 40 μm or greater). With decreasing $T_{A1}$, the smoothness of the first adhesive face tends to more significantly influence the properties of the entire PSA sheet. From such a standpoint, the art disclosed herein can be preferably implemented in an embodiment where $T_{A1}$ is about 250 μm or less (more preferably about 150 μm or less, e.g. about 100 μm or less). In an embodiment, $T_{A1}$ can be about 60 μm or less (e.g. about 50 μm or less).

In an embodiment of the art disclosed herein, the PSA layer constituting the first adhesive face may have a ratio of its 23° C. storage modulus ($G'_{23}$) to its thickness ($T_{A1}$) of less than about 10 MPa/mm. A PSA sheet comprising a PSA layer whose $G'_{23}/T_{A1}$ is below the prescribed value tends to show better initial adhesiveness to an adherend as compared with a PSA layer having a larger $G'_{23}/T_{A1}$ value. For example, with the PSA layer having a $G'_{100}$ of about 0.08 MPa or greater (typically about 0.08 MPa or greater, but less than about 0.50 MPa) and a $G'_{23}/T_{A1}$ of less than about 10 MPa/mm, even if the release film on the first adhesive face is replaced with a less smooth release film, the first adhesive face can be less likely to be roughened, bringing about a PSA sheet with good initial adhesiveness to an adherend. From the standpoint of obtaining better effects, in an embodiment, $G'_{23}/T_{A1}$ can be about 8.0 MPa/mm or less. The art disclosed herein can be preferably implemented, for instance, in an embodiment where $G'_{23}/T_{A1}$ is about 6.0 MPa/mm or less (e.g. about 5.0 MPa/mm or less). The lower limit of $G'_{23}/T_{A1}$ is usually suitably, but not particularly limited to, about 0.2 MPa/mm or greater.

When the PSA sheet disclosed herein is in an embodiment of the double-faced PSA sheet, the second adhesive face can be the other surface of the PSA layer that constitutes the first adhesive face. For its simple construction, the double-faced PSA sheet in such an embodiment (substrate-free double-faced PSA sheet) is suitable for increasing optical properties (e.g. transparency). Alternatively, the second adhesive face can be a surface of a different PSA layer from the PSA layer constituting the first adhesive face, that is, the second PSA layer. The double-faced PSA sheet in such an embodiment is typically a substrate-supported double-faced PSA sheet and may bring about various properties in accordance with a combination of compositions and constructions of the first and second PSA layers as well as the selection of a support substrate. Although not particularly limited to, in an embodiment, the first and second PSA layers can be constituted so as to satisfy one, two or more conditions of the aforementioned various properties (e.g. $G'_{100}$, $G'_{23}$, $G'_{100}/G'_{23}$, $T_{A1}$, $G'_{100}/T_{A1}$, $G'_{23}/T_{A1}$ and haze values).

<PSA>

In the art disclosed herein, the type of PSA that constitutes the PSA layer is not particularly limited. For example, the PSA layer may be constituted, comprising one, two or more species of PSA selected among various known species of PSA, such as an acrylic PSA, rubber-based PSA (natural rubber-based, synthetic rubber-based, their mixture-based, etc.), silicone-based PSA, polyester-based PSA, urethane-based PSA, polyether-based PSA, polyamide-based PSA, fluorine-based PSA, etc. Herein, the acrylic PSA refers to a PSA comprising a (meth)acrylic polymer as the base polymer (the primary component among polymers, i.e. a component accounting for more than 50% by mass). The same applies to the rubber-based PSA and other PSA. In a PSA layer preferable from the standpoint of the transparency, weatherability, etc., the acrylic PSA content is 50% by weight or greater, more preferably 70% by weight or greater, or yet more preferably 90% by weight or greater. The acrylic PSA content can be greater than 98% by weight, or the PSA layer may essentially consist of an acrylic PSA.

As used herein, the term "(meth)acrylate" comprehensively refers to acrylate and methacrylate. Similarly, the term "(meth)acryloyl" comprehensively refers to acryloyl and methacryloyl while the term "(meth)acryl" comprehensively refers to acryl and methacryl.

In this description, the (meth)acrylic polymer refers to a polymer that comprises a (meth)acrylic monomer as a monomeric component constituting the (meth)acrylic polymer. In other words, it refers to a polymer comprising a monomer unit derived from a (meth)acrylic monomer. Herein, the (meth)acrylic monomer refers to a monomer having at least one (meth)acryloyl group per molecule.

Although not particularly limited to, in an embodiment of the art disclosed herein, the PSA layer can be preferably prepared, using a PSA composition that comprises monomeric components that constitute the (meth)acrylic polymer. Hereinafter, such a PSA composition may be referred to as a "(meth)acrylic PSA composition." Herein, the term "monomeric components that constitute a (meth)acrylic polymer" refers to monomeric components constituting the (meth)acrylic polymer in the PSA obtained from the (meth)acrylic composition. The monomeric components may be included as unreacted monomers (i.e. as starting monomers whose polymerizable functional groups are unreacted) or in a polymerized form (i.e. as a monomer unit).

<Monomeric Component>

In an embodiment of the art disclosed herein, the PSA layer can be formed with a PSA composition comprising as a monomeric component constituting the (meth)acrylic polymer, a component (A) described below. In a preferable embodiment, the PSA layer can be preferably formed with a (meth)acrylic PSA composition that comprises at least the component (A) as a monomeric component constituting the (meth)acrylic polymer and further comprises, as necessary, one or each of components (B) and (C) described below.

(Component (A))

The component (A) is an alkyl (meth)acrylate having an alkyl group with 2 to 18 carbons at the ester end. Hereinafter, an alkyl (meth)acrylate having an alkyl group with a number of carbons ranging from X up to Y at the ester end may be represented by "$C_{X-Y}$ alkyl (meth)acrylate." The structure of $C_{2-18}$ alkyl group in the $C_{2-18}$ alkyl (meth)acrylate is not particularly limited. The alkyl group can be either a straight chain or a branched chain. For the component (A), these $C_{2-18}$ alkyl (meth)acrylates can be used singly as one species or in combination of two or more species.

Examples of a $C_{2-18}$ alkyl (meth)acrylate having a straight-chain alkyl group at the ester end include ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-nonyl (meth)acrylate, n-decyl (meth)acrylate, n-undecyl (meth)acrylate, n-dodecyl (meth)acrylate, n-tridecyl (meth)acrylate, n-tetradecyl (meth)acrylate, n-pentadecyl (meth)acrylate, n-hexadecyl (meth)acrylate, n-heptadecyl (meth)acrylate, and n-octadecyl (meth)acrylate. Examples of a $C_{2-18}$ alkyl (meth)acrylate having a branched alkyl group at the ester end include isopropyl (meth)acrylate, tert-butyl (meth)acrylate, isobutyl (meth)acrylate, isopentyl (meth)acrylate, tert-pentyl (meth)acrylate, neopentyl (meth)acrylate, isohexyl (meth)acrylate, isoheptyl (meth)acrylate, 2-ethylhexyl (meth)acrylate, isooctyl (meth)acrylate, isononyl (meth)acrylate, isodecyl (meth)acrylate, 2-propylheptyl (meth)acrylate, isoundecyl (meth)acrylate, isododecyl (meth)acrylate, isotridecyl (meth)acrylate, isomyristyl (meth)acrylate, isopentadecyl (meth)acrylate, isohexadecyl (meth)acrylate, isoheptadecyl (meth)acrylate, and isostearyl (meth)acrylate. The art disclosed herein can be preferably implemented in an embodiment where the component (A) comprises one, two or more species selected from $C_{4-9}$ alkyl acrylates. Preferable examples of $C_{4-9}$ alkyl acrylates include n-butyl acrylate, 2-ethylhexyl acrylate, isooctyl acrylate and isononyl acrylate.

(Component (B))

The component (B) is an alicyclic monomer. In an embodiment using the component (B) in combination with the component (A), the PSA layer can be preferably made to combine a preferable storage modulus disclosed herein and other adhesive properties (e.g. adhesiveness to adherend) in a well-balanced manner.

As the alicyclic monomer, any monomer having an alicyclic structure-containing group as well as an unsaturated double bond-containing polymerizable functional group such as a (meth)acryloyl group or a vinyl group may be used without limitations. For the component (B), these alicyclic monomers can be used singly as one species or in combination of two or more species. As used herein, the term "alicyclic structure-containing group" refers to a moiety having at least one alicyclic structure. The term "alicyclic structure" refers to a carbocyclic ring structure which may be saturated or unsaturated, but may not be aromatic. In this description, the alicyclic structure-containing group may be simply referred to as "alicyclic group." Preferable examples of the alicyclic group include a hydrocarbon group and a hydrocarbon-oxy group each having an alicyclic structure.

In the art disclosed herein, preferable alicyclic monomers include an alicyclic (meth)acrylate having an alicyclic group and a (meth)acryloyl group. Specific examples of alicyclic (meth)acrylates include cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, isobornyl (meth)acrylate, and dicyclopentanyl (meth)acrylate as well as HPMPA, TMA-2 and HCPA represented by the formulas shown below.

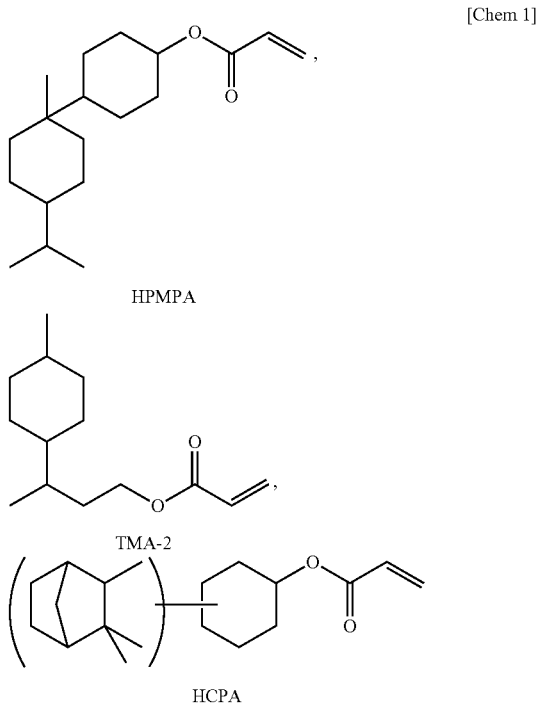

[Chem 1]

HPMPA

TMA-2

HCPA

There are no particular limitations to the number of carbons of the alicyclic group in the alicyclic monomer (in an alicyclic (meth)acrylate, the number of carbons in the alicyclic (meth)acrylate excluding the (meth)acryloyl group). For instance, an alicyclic monomer whose alicyclic group has 4 to 24 (preferably 5 to 18, more preferably 5 to 12) carbons can be used. In particular, cyclohexyl acrylate (CHA), cyclohexyl methacrylate, isobornyl acrylate (IBXA) and isobornyl methacrylate are preferable. CHA and IBXA are more preferable while CHA is particularly preferable.

(Component (C))

The component (C) is a monomer having at least either a hydroxyl group or a carboxyl group.

As the hydroxyl group-containing monomer, any species having a hydroxyl group as well as an unsaturated double bond-containing polymerizable functional group, such as a (meth)acryloyl group or a vinyl group can be used without particular limitations. For the hydroxyl group-containing monomer, solely one species or a combination of two or more species can be used. Examples of the hydroxyl group-containing monomer include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate; and hydroxyalkylcycloalkane (meth)acrylates such as (4-hydroxymethylcyclohexyl)methyl (meth)acrylate. Other examples include hydroxyethyl(meth)acrylamide, allyl alcohol, 2-hydroxyethyl vinyl ether, 4-hydroxybutyl vinyl ether, diethylene glycol monovinyl ether, etc. Among these, hydroxyalkyl (meth)acrylates are preferable. For instance, a hydroxyalkyl (meth)acrylate having a hydroxyalkyl group of 2 to 6 carbons can be preferably used. In a preferable embodiment, as the hydroxyl group-containing monomer, one, two or more species can be selected and used from 2-hydroxyethyl acrylate (2HEA), 2-hydroxyethyl methacrylate, 4-hydroxybutyl acrylate (4HBA) and 4-hydroxybutyl methacrylate. In some preferable embodiments of the art disclosed herein, the hydroxyl group-containing monomer used can be solely 4HBA, solely 2HEA, or a combination of 4HBA and 2HEA.

As the carboxyl group-containing monomer, any monomer having a carboxyl group and an unsaturated double bond-containing polymerizable functional group such as a (meth)acryloyl group or a vinyl group may be used without particular limitations. Carboxyl group-containing monomers can be used singly as one species or in combination of two or more species. Examples of the carboxyl group-containing monomer include ethylenic unsaturated monocarboxylic acids such as acrylic acid, methacrylic acid, crotonic acid, carboxyethyl (meth)acrylate, carboxypentyl (meth)acrylate, etc.; and ethylenic unsaturated dicarboxylic acids such as itaconic acid, maleic acid, fumaric acid, citraconic acid, etc.; as well as metal salts (e.g. alkali metal salts) of these; anhydrides of the ethylenic unsaturated dicarboxylic acids such as maleic anhydride, itaconic anhydride, etc.; and the like. Among these, acrylic acid and methacrylic acid are preferable, and acrylic acid is particularly preferable.

The art disclosed herein can be preferably implemented in an embodiment where the component (C) comprises a hydroxyl group-containing monomer. In other words, it is preferable that the component (C) either consists of a hydroxyl group-containing monomer or comprises a hydroxyl group-containing monomer and a carboxyl group-containing monomer. When the component (C) comprises a hydroxyl group-containing monomer and a carboxyl group-containing monomer, the hydroxyl group-containing monomer content in the entire component (C) is preferably greater than about 50% by weight, or more preferably about 80% by weight or greater (e.g. about 90% by weight or greater). It is preferable to increase the hydroxyl group-containing monomer content in the component (C) from the standpoint of reducing metal corrosion caused by the carboxyl group, etc. The art disclosed herein can be preferably implemented in an embodiment where the monomeric components are essentially free of a carboxyl group-containing monomer. For instance, the carboxyl group-containing monomer content in the monomeric components can be less than about 1% by weight, preferably less than about 0.5% by weight, or more preferably less than about 0.2% by weight.

The ratio (content) of component (A) to all monomeric components is not particularly limited. For the likelihood of obtaining a PSA layer having a preferable value of one or each of $G'_{100}$ and $G'_{100}/G'_{23}$, etc., the component (A) content is suitably about 90% by weight or less, preferably about 85% by weight or less, or yet more preferably about 70% by weight or less. In a preferable embodiment, the component (A) content can be about 60% by weight or less (or even about 50% by weight or less, e.g. about less than 50% by weight). From the standpoint of the initial adhesiveness to an adherend, etc., the component (A) content is preferably about 30% by weight or greater, or more preferably about 35% by weight or greater. In an embodiment, the ratio of component (A) to all monomeric components can be, for instance, about 30 to 70% by weight.

When a component (B) is included as a monomeric component, the ratio (content) of component (B) to all monomeric components is not particularly limited. For the likelihood of obtaining a PSA layer having a preferable value for one or each of $G'_{100}$ and $G'_{100}/G'_{23}$, the component (B) content is usually suitably about 3% by weight or greater, preferably about 5% by weight or greater, or more preferably about 8% by weight or greater (e.g. about 10% by weight or greater). From the standpoint of the initial adhesion to an adherend, etc., the component (B) content is suitably about 65% by weight or less, preferably about 60% by weight or less, or more preferably about 55% by weight or less (or even about 50% by weight or less, e.g. less than about 50% by weight). In a preferable embodiment, the ratio of component (B) to all monomeric components can be about 15% by weight or greater, about 20% by weight or greater, about 25% by weight or greater, or even about 30% by weight or greater (e.g. about 35% by eight or greater). In an embodiment, the ratio of component (B) to all monomeric components can be, for instance, about 20 to 50% by weight.

When a component (C) is included as a monomeric component, the ratio (content) of component (C) to all monomeric components is not particularly limited. From the standpoint of the initial adhesion to an adherend, etc., the component (C) content is typically about 3% by weight or greater, preferably about 5% by weight or greater, or more preferably about 8% by weight or greater (e.g. about 10% by weight or greater). For the likelihood of obtaining a PSA layer having a preferable value for one or each of $G'_{100}$ and $G'_{100}/G'_{23}$, the component (C) content is preferably about 35% by weight or less, more preferably about 30% by weight or less, or even more preferably about 25% by weight or less. In an embodiment, the component (C) content can be, for instance, about 15 to 30% by weight.

(Optional Monomer)

The monomeric components in the art disclosed herein may comprise other monomer(s) (or "optional monomer(s)" hereinafter) in addition to the component (A), component (B) and component (C).

Examples of these optional monomers include heterocyclic monomers such as a cyclic nitrogen-containing monomer, a cyclic ether group-containing monomer, etc. Similarly to the component (B), such a heterocyclic monomer can contribute to bring about a PSA layer that comprises preferable storage moduli disclosed herein and other adhesive properties or other features at a good balance. It may also contribute to increase the adhesive strength and cohesive strength of the PSA. Heterocyclic monomers can be used solely as one species or in combination of two or more species.

Any monomer having a cyclic nitrogen-containing structure and an unsaturated double bond-containing polymerizable functional group such as a (meth)acryloyl group or a vinyl group may be used without limitations as the cyclic nitrogen-containing monomer. The cyclic nitrogen-containing structure preferably has a nitrogen atom in the ring structure. Examples of the cyclic nitrogen-containing monomer include vinyl lactam monomers such as N-vinylpyrrolidone, N-vinyl-ε-caprolactam, methylvinylpyrrolidone, etc.; oxazoline group-containing monomers such as 2-vinyl-2-oxazoline, 2-vinyl-5-methyl-2-oxazoline, 2-isopropenyl-2-oxazoline, etc.; nitrogen-containing heterocyclic vinyl monomers such as vinylpyridine, vinylpiperidone, vinylpyrimidine, vinylpiperazine, vinylpyrazine, vinylpyrrole, vinylimidazole, vinylmorpholine, etc.; and the like. The cyclic nitrogen-containing monomer may also be a (meth)acrylic monomer having a nitrogen-containing heterocyclic ring such as a morpholine ring, a piperidine ring, a pyrrolidine ring, a piperazine ring, an aziridine ring, etc. Specific examples include N-acryloyl morpholine, N-acryloyl piperidine, N-methacryloyl piperidine, N-acryloyl pyrrolidine, N-acryloyl aziridine, etc. Among them, vinyl lactam monomers are preferable in view of cohesiveness, and N-vinylpyrrolidone is particularly preferable.

Any monomer having a cyclic ether group such as an epoxy group or an oxetane group as well as an unsaturated double bond-containing polymerizable functional group such as a (meth)acryloyl group or a vinyl group may be used without limitations as the cyclic ether group-containing monomer. Examples of the epoxy group-containing monomer include glycidyl (meth)acrylate, 3,4-epoxycyclohexylmethyl (meth)acrylate, and 4-hydroxybutyl (meth)acrylate glycidyl ether. Examples of the oxetane group-containing monomer include 3-oxetanylmethyl (meth)acrylate, 3-methyl-oxetanylmethyl (meth)acrylate, 3-ethyl-oxetanylmethyl (meth)acrylate, 3-butyl-oxetanylmethyl (meth)acrylate, and 3-hexyl-oxetanylmethyl (meth)acrylate.

Other examples of the optional monomers include an alkyl (meth)acrylate that does not belong to the component (A), that is, an alkyl (meth)acrylate having an alkyl group with a single carbon or 19 or more (e.g. 19 to 24) carbons. Specific examples of such an alkyl (meth)acrylate include methyl (meth)acrylate, n-nonadecyl (meth)acrylate, isononadecyl (meth)acrylate, n-eicosyl (meth)acrylate, isoeicosyl (meth)acrylate, etc. These can be used singly as one species or in combination of two or more species.

Other examples of the optional monomer include a monomer having a functional group that is neither a hydroxyl group nor a carboxyl group. Such a functional group-containing monomer can be used to introduce crosslinking points in the (meth)acrylic polymer or to increase the cohesive strength of (meth)acrylic polymer. Examples of such a functional group-containing monomer include amide group-containing monomers such as (meth)acrylamide, N,N-dimethyl(meth)acrylamide, N-methylol(meth)acrylamide, etc.; cyano group-containing monomers such as acrylonitrile, methacrylonitrile, etc.; sulfonic acid group-containing monomers such as styrene sulfonic acid, allyl sulfonic acid, 2-(meth)acrylamido-2-methylpropanesulfonic acid, etc.; phosphoric acid group-containing monomers such as 2-hydroxyethyl acryloyl phosphate, etc.; keto group-containing monomers such as diacetone (meth)acrylamide, diacetone (meth)acrylate, vinyl methyl ketone, vinyl acetoacetate, etc.; isocyanate group-containing monomers such as 2-(meth)acryloyloxyethyl isocyanate, etc.; alkoxyl group-containing monomers such as methoxyethyl (meth) acrylate, ethoxyethyl (meth)acrylate, etc.; alkoxysilyl group-containing monomers such as (3-(meth)acryloxypropyl)trimethoxysilane, (3-(meth)acryloxypropyl)triethoxysilane, etc.; and the like. These can be used singly as one species or in combination of two or more species.

To adjust the (meth)acrylic polymer's Tg or to increase the cohesive strength, etc., the monomeric components in the art disclosed herein may comprise, as the optional monomer, a monomer that is copolymerizable with the components (A), (B) and (C) other than those listed above. Examples of such a copolymerizable monomer include carboxylic acid vinyl esters such as vinyl acetate, vinyl propionate, etc.; aromatic vinyl compounds such as styrene, substituted styrenes (α-methylstyrene, etc.), vinyl toluene, etc.; aromatic ring-containing (meth)acrylates such as aryl (meth)acrylate (e.g. phenyl (meth)acrylate), aryloxyalkyl (meth)acrylate (e.g. phenoxyethyl (meth)acrylate), arylalkyl (meth)acrylate (e.g. benzyl (meth)acrylate), etc.; olefinic monomers such as ethylene, propylene, isoprene, butadiene, isobutylene, etc.; chlorine-containing monomers such as vinyl chloride, vinylidene chloride, etc.; vinyl ether-based monomers such as methyl vinyl ether, ethyl vinyl ether, etc.; a macromonomer having a radically polymerizable vinyl group at the monomer end in a vinylic polymer; and the like. These can be used singly as one species or in combination of two or more species.

The amounts of these optional monomers used are not particularly limited and can be suitably selected. Usually, the total amount of optional monomers used is suitably less than about 50% by weight of the monomeric components, preferably about 30% by weight or less, or more preferably about 20% by weight or less. The art disclosed herein can be preferably implemented in an embodiment where the total amount of optional monomers used is about 10% by weight or less (e.g. about 5% by weight or less) of the monomeric components. When using an optional monomer, from the standpoint of suitably bringing about the effect to increase the adhesive strength or cohesive strength, the amount of the optional monomer used is suitably about 0.5% by weight or more of the monomeric components, or preferably about 0.8% by weight or more. The art disclosed herein can be preferably implemented also in an embodiment using essentially no optional monomers (e.g. an embodiment where the amount of optional monomers used is about 0.3% by weight or less of the monomeric components, or typically about 0.1% by weight or less).

The component (A), component (B), component (C) and optional monomers described above are typically monofunctional monomers. Besides these monofunctional monomers, for adjusting the storage modulus of the PSA layer, etc., the monomeric components can comprise a suitable amount of a polyfunctional monomer as necessary. As used herein, the monofunctional monomer refers to a monomer having a single polymerizable functional group (typically a radically polymerizable functional group) having an unsaturated double bond, such as a (meth)acryloyl group or a vinyl group. On the other hand, the polyfunctional monomer refers to a monomer having at least two such polymerizable functional groups as described later.

(Polyfunctional Monomer)

The polyfunctional monomer has at least two polymerizable functional groups (radically polymerizable functional groups in typical) having unsaturated double bonds, such as (meth)acryloyl group, vinyl group, etc. Examples of the polyfunctional monomer include an ester of a polyol and a (meth)acrylic acid such as ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth) acrylate, pentaerythritol tri(meth)acrylate, dipentaerythritol hexa(meth)acrylate, 1,2-ethyleneglycol di(meth)acrylate, 1,4-butanediol di(meth)acrylate, 1,6-hexanediol di(meth) acrylate, 1,12-dodecanediol di(meth)acrylate, trimethylolpropane tri(meth)acrylate, tetramethylolmethane tri(meth) acrylate, etc.; allyl (meth)acrylate, vinyl (meth)acrylate, divinylbenzene, epoxy acrylate, polyester acrylate, urethane acrylate, and the like. Among them, preferable examples are trimethylolpropane tri(meth)acrylate, 1,6-hexanediol di(meth)acrylate, and dipentaerythritol hexa(meth)acrylate. A particularly preferable examples is 1,6-hexanediol di(meth) acrylate. The polyfunctional monomers can be used solely as one species or in combination of two or more species. From the standpoint of the reactivity, etc., it is usually preferable to use a polyfunctional monomer having two or more acryloyl groups.

The amount of the polyfunctional monomer used is not particularly limited. It can be set to suitably achieve the purpose of use of the polyfunctional monomer. In an embodiment, from the standpoint of combining a preferable storage modulus disclosed herein and other adhesive performance or other properties in a good balance, the polyfunctional monomer is used in an amount of preferably about 3% by weight or less, more preferably 2% by weight or less, or even more preferably about 1% by weight or less (e.g. about 0.5% by weight or less) of the monomeric components. When using a polyfunctional monomer, its lower limit of use should just be greater than 0% by weight and is not particularly limited. In usual, when the polyfunctional monomer used accounts for about 0.001% by weight or greater (e.g. about 0.01% by weight or greater) of the monomeric components, the effect of the use of the polyfunctional monomer can be suitably obtained.

Although not particularly limited, the combined components (A), (B) and (C) content in all the monomeric components is typically greater than about 50% by weight, preferably about 70% by weight or greater, more preferably about 80% by weight or greater, or yet more preferably about 90% by weight or greater. The art disclosed herein can be preferably implemented in an embodiment where their combined content is about 95% by weight or greater (e.g. about 99% by weight or greater). Their combined content can be 100% by weight. The art disclosed herein can be preferably implemented in an embodiment where their combined content accounts for 99.999% by weight or less (e.g. 99.99% by weight or less) of the monomeric components.

Although not particularly limited to, from the standpoint of the adhesiveness and low temperature characteristics of the PSA sheet, etc., the copolymer corresponding to the composition of the monomeric components has a Tg value of preferably −20° C. or below, or more preferably −25° C. or below. For the likelihood of obtaining a PSA layer having a preferable value for one or each of $G'_{100}$ and $G'_{100}/G'_{23}$, etc., the copolymer's Tg is suitably about −55° C. or above, preferably about −50° C. or above, or more preferably about −45° C. or above. The art disclosed herein can be preferably implemented also in an embodiment where the copolymer's Tg is about −40° C. or above (e.g. about −35° C. or above).

The Tg of the copolymer corresponding to the composition of the monomeric components herein refers to the value determined by the Fox equation based on the composition of the monomeric components. As shown below, the Fox equation is a relational expression between the Tg of a copolymer and glass transition temperatures Tgi of homopolymers of the respective monomers constituting the copolymer.

$$1/Tg = \Sigma(Wi/Tgi)$$

In the Fox equation above, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i. In this description, Tg values are determined based on only monofunctional monomers. Accordingly, when the monomeric components include a polyfunctional monomer, the combined amount of monofunctional monomers in the monomeric components is counted as 100% by weight, and the Tg value is determined based on the Tg values of homopolymers of the respective monofunctional monomers and the weight fractions of the monofunctional monomers relative to their combined amount.

As the glass transition temperatures of homopolymers used for determining the Tg value, values found in publicly known documents are used. For example, with respect to the monomers listed below, as the glass transition temperatures of homopolymers of the monomers, the following values are used:

| | |
|---|---|
| n-Butyl acrylate | −55° C. |
| 2-Ethylhexyl acrylate | −70° C. |
| Cyclohexyl acrylate | 15° C. |
| Isobornyl acrylate | 94° C. |
| 2-Hydroxyethyl acrylate | −15° C. |
| 4-Hydroxybutyl acrylate | −40° C. |
| Acrylic acid | 106° C. |
| Methacrylic acid | 228° C. |

With respect to the glass transition temperatures of homopolymers of monomers other than those listed above, values given in "Polymer Handbook" (3rd edition, John Wiley & Sons, Inc., Year 1989) are used. When the literature provides two or more values for a certain monomer, the highest value is used.

With respect to monomers for which no glass transition temperatures of the corresponding homopolymers are given in the "Polymer Handbook", values obtained by the following measurement method are used (see Japanese Patent Application Publication No. 2007-51271). In particular, to a reaction vessel equipped with a thermometer, a stirrer, a nitrogen inlet and a condenser, are added 100 parts by weight of monomer(s), 0.2 part by weight of azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to 63° C. and the reaction is carried out for 10 hours. Then, it is cooled to room temperature and a homopolymer solution having 33% by weight solid content is obtained. Then, this homopolymer solution is applied onto a release film by flow coating and allowed to dry to prepare a test sample (a homopolymer sheet) of about 2 mm thickness. This test sample is cut out into a disc of 7.9 mm diameter and is placed between parallel plates; and while applying a shear strain at a frequency of 1 Hz using a rheometer (a TA Instruments product, ARES), the viscoelasticity is measured in the shear mode over a temperature range of −70° C. to 150° C. at a heating rate of 5° C./min; and the temperature value at the maximum of the tan δ (loss tangent) curve is taken as the glass transition temperature.

<PSA Composition>

The PSA layer disclosed herein can be formed with a PSA composition that comprises monomeric components in a composition as described above as a polymerized product, in a non-polymerized form (i.e. in a form where the polymerizable functional groups are still unreacted), or as a mixture of these. The PSA composition may be in various forms such as a solvent-based PSA composition which comprises PSA (adhesive components) in an organic solvent; an aqueous PSA composition which comprises PSA dispersed in an aqueous solvent; an active energy ray-curable PSA composition prepared so as to form PSA when cured with active energy rays such as UV rays, radioactive rays, etc.; a hot melt-type PSA composition which is heated to melting for application and allowed to cool to around room temperature to form PSA; and the like.

Herein, the term "active energy ray" in this description refers to an energy ray having energy capable of causing a chemical reaction such as polymerization, crosslinking, initiator decomposition, etc. Examples of the active energy ray herein include lights such as ultraviolet (UV) rays, visible lights, infrared lights, radioactive rays such as α rays, β rays, Y rays, electron beam, neutron radiation, X rays, etc.

The PSA composition typically comprises at least some of the monomeric components (possibly a certain species among the monomers or a fraction of its quantity) as a polymer. The polymerization method for forming the polymer is not particularly limited. Heretofore known various polymerization methods can be suitably used. For instance, thermal polymerization (typically carried out in the presence of a thermal polymerization initiator) such as solution polymerization, emulsion polymerization, bulk polymerization, etc.; photopolymerization carried out by irradiating light such as UV light, etc. (typically in the presence of a photopolymerization initiator); active energy ray polymerization carried out by irradiating radioactive rays such as β rays, Y rays, etc.; and the like. In particular, photopolymerization is preferable. In these polymerization methods, the embodiment of polymerization is not particularly limited. It can be carried out with a suitable selection of a heretofore known monomer supply method, polymerization conditions (temperature, time, pressure, irradiance of light, irradiance of radioactive rays, etc.), materials (polymerization initiator, surfactant, etc.) used besides the monomers, etc.

For the polymerization, depending on the polymerization method and embodiment of polymerization, etc., a known or commonly used photopolymerization initiator or thermal polymerization initiator can be used. These polymerization initiators can be used singly as one species or in a suitable combination of two or more species.

Examples of the photopolymerization initiator include, but not particularly limited to, ketal-based photopolymerization initiators, acetophenone-based photopolymerization initiators, benzoin ether-based photopolymerization initiators, acylphosphine oxide-based photopolymerization initiators, α-ketol-based photopolymerization initiators, aromatic sulfonyl chloride-based photopolymerization initiators, photoactive oxime-based photopolymerization initiators, benzoin-based photopolymerization initiators, benzil-based photopolymerization initiators, benzophenone-based photopolymerization initiators, thioxanthone-based photopolymerization initiators and the like.

Specific examples of ketal-based photopolymerization initiators include 2,2-dimethoxy-1,2-diphenylethane-1-one (e.g. trade name "IRGACURE 651" available from BASF Corporation), etc.

Specific examples of acetophenone-based photopolymerization initiators include 1-hydroxycyclohexyl phenyl ketone (e.g. trade name "IRGACURE 184" available from BASF Corporation), 4-phenoxydichloroacetophenone, 4-t-butyl-dichloroacetophenone, 1-[4-(2-hydroxyethoxy)-phenyl]-2-hydroxy-2-methyl-1-propane-1-one (e.g. trade name "IRGACURE 2959" available from BASF Corporation), 2-hydroxy-2-methyl-1-phenyl-propane-1-one (e.g. trade name "DAROCUR 1173" available from BASF Corporation), methoxyacetophenone, etc.

Specific examples of benzoin ether-based photopolymerization initiators include benzoin ethers such as benzoin methyl ether, benzoin ethyl ether, benzoin propyl ether, benzoin isopropyl ether, benzoin isobutyl ether, etc., as well as substituted benzoin ethers such as anisole methyl ether, etc.

Specific examples of acylphosphine oxide-based photopolymerization initiators include bis(2,4,6-trimethylbenzoyl)phenylphosphine oxide (e.g. trade name "IRGACURE 819" available from BASF Corporation), bis(2,4,6-trimethylbenzoyl)-2,4-di-n-butoxyphenylphosphine oxide, 2,4,6-trimethylbenzoyldiphenylphosphine oxide (e.g. trade name "LUCIRIN TPO" available from BASF Corporation), bis(2,6-dimethoxybenzoyl)-2,4,4-trimethylpentylphosphine oxide, etc.

Specific examples of α-ketol-based photopolymerization initiators include 2-methyl-2-hydroxypropiophenone, 1-[4-(2-hydroxyethyl)phenyl]-2-methylpropane-1-one, etc. Specific examples of aromatic sulfonyl chloride-based photopolymerization initiators include 2-naphthalenesulfonyl chloride, etc. Specific examples of photoactive oxime-based photopolymerization initiators include 1-phenyl-1,1-propanedione-2-(o-ethoxycarbonyl)-oxime, etc. Specific examples of benzoin-based photopolymerization initiators include benzoin, etc. Specific examples of benzil-based photopolymerization initiators include benzil, etc.

Specific examples of benzophenone-based photopolymerization initiators include benzophenone, benzoylbenzoic acid, 3,3'-dimethyl-4-methoxybenzophenone, polyvinylbenzophenone, α-hydroxycyclohexylphenylketone, etc.

Specific examples of thioxanthone-based photopolymerization initiators include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone, dodecylthioxanthone, etc.

The thermal polymerization initiator is not particularly limited. For example, can be used an azo-based polymerization initiator, peroxide-based polymerization initiator, a redox-based polymerization initiator by combination of a peroxide and a reducing agent, a substituted ethane-based polymerization initiator, etc. More specific examples include, but not limited to, azo-based initiators such as 2,2'-azobisisobutyronitrile, 2,2'-azobis(2-methylpropionamidine) disulfate, 2,2'-azobis(2-amidinopropane) dihydrochloride, 2,2'-azobis[2-(5-methyl-2-imidazolin-2-yl)propane]dihydrochloride, 2,2'-azobis(N,N'-dimethyleneisobutylamidine), 2,2'-azobis(2-carboxyethyl)-2-methylpropionamidine] hydrate, etc.; persulfates such as potassium persulfate, ammonium persulfate, etc.; peroxide-based initiators such as benzoyl peroxide, t-butyl hydroperoxide, hydrogen peroxide, etc.; substituted ethane-based initiators such as phenyl-substituted ethane, etc.; redox-based initiators such as combination of a persulfate salt and sodium hydrogen sulfite, combination of a peroxide and sodium ascorbate, etc.; and the like. Thermal polymerization can be preferably carried out at a temperature of, for instance, about 20° C. to 100° C. (typically 40° C. to 80° C.).

Such thermal polymerization initiator or photopolymerization initiator can be used in a usual amount in accordance with the polymerization method, embodiment of polymerization, etc., and there are no particular limitations to the amount. For instance, relative to 100 parts by weight of monomers to be polymerized, about 0.001 to 5 parts by weight (typically about 0.01 to 2 parts by weight, e.g. about 0.01 to 1 part by weight) of polymerization initiator can be used.

(PSA Composition Comprising Polymerized and Non-Polymerized (Unreacted) Monomeric Components)

The PSA composition according to a preferable embodiment comprises a polymerization product of a monomer mixture comprising at least some of the monomeric components (starting monomers) that constitute the composition. Typically, of the monomeric components, some are included as a polymerized product and the rest are included as unreacted monomers. The polymerization product of the monomer mixture can be prepared by polymerizing the monomer mixture at least partially.

The polymerization product is preferably a partially-polymerized product of the monomer mixture. Such a partially-polymerized product is a mixture of a polymer formed from the monomer mixture and unreacted monomers, and is typically in a form of syrup (viscous liquid). Hereinafter, a partially-polymerized product having such a form may be referred to as "monomer syrup" or simply "syrup."

The polymerization method for obtaining the polymerization product from the monomers is not particularly limited. A suitable method can be selected and employed among various polymerization methods as those described earlier. From the standpoint of the efficiency and convenience, a photopolymerization method can be preferably employed. According to a photopolymerization, depending on the polymerization conditions such as irradiation light quantity, etc., the polymer conversion of the monomer mixture can be easily controlled.

With respect to the partially-polymerized product, the monomer conversion of the monomer mixture is not particularly limited. The monomer conversion can be, for instance, about 70% by weight or lower, or preferably about 60% by weight or lower. From the standpoint of facile preparation of the PSA composition comprising the partially-polymerized product and ease of application, etc., the monomer conversion is usually suitably about 50% by weight or lower, or preferably about 40% by weight or lower (e.g. about 35% by weight or lower). The lower limit of monomer conversion is not particularly limited. It is typically about 1% by weight or higher, or usually suitably about 5% by weight or higher.

The PSA composition comprising a partially-polymerized product of the monomer mixture can be easily obtained, for instance, by partially polymerizing a monomer mixture comprising all the starting monomers in accordance with a suitable polymerization method (e.g. photopolymerization). To the PSA composition comprising the partially-polymerized product, other components (e.g. photopolymerization initiator, polyfunctional monomer(s), crosslinking agent, acrylic oligomer described later, etc.) may be added as necessary. Methods for adding such other components are not particularly limited. For instance, they can be added to the monomer mixture in advance or added to the partially-polymerized product.

The PSA composition disclosed herein may also be in a form where a fully-polymerized product of a monomer mixture comprising certain species (starting monomers) among the monomeric components is dissolved in the rest of the monomers (unreacted) or a partially-polymerized product thereof. A PSA composition in such a form is also included in examples of the PSA composition comprising polymerized and non-polymerized (unreacted) monomeric components. As used herein, the term "fully-polymerized product" refers to a product whose monomer conversion is higher than 95% by weight.

When forming PSA from a PSA composition comprising polymerized and non-polymerized monomeric components, a photopolymerization method can be preferably employed as the curing method (polymerization method). With respect to a PSA composition comprising a polymerization product prepared by a photopolymerization method, it is particularly preferable to employ photopolymerization as the curing method. A polymerization product obtained by photopolymerization already contains a photopolymerization initiator. When the PSA composition comprising the polymerization product is cured to form PSA, the photo-curing can be carried out without any additional photopolymerization initiator. Alternatively, the PSA composition may be obtained by adding a photopolymerization initiator as necessary to the polymerization product prepared by photopolymerization. The additional photopolymerization initiator may be the same as or different from the photopolymerization initiator used in preparing the polymerization product. If the PSA composition is prepared by a method other than photopolymerization, a photopolymerization initiator can be added to make it light-curable. The light-curable PSA composition is advantageous as it can readily form even a thick PSA layer. In a preferable embodiment, the PSA composition can be photopolymerized by UV irradiation to form a PSA. The UV irradiation may be performed using a commonly-known high-pressure mercury lamp, low-pressure mercury lamp, metal halide lamp, or the like.

(PSA Composition Comprising Monomeric Components in a Fully-Polymerized Form)

The PSA composition according to another preferable embodiment comprises the monomeric components as a fully-polymerized product. Such a PSA composition may be in a form of, for instance, a solvent-based composition which comprises in an organic solvent a (meth)acrylic polymer which is the fully-polymerized product of the monomeric components, a water-dispersed composition such that the (meth)acrylic polymer is dispersed in an aqueous solvent, etc.

(Crosslinking Agent)

The PSA composition disclosed herein can comprise a crosslinking agent. For the crosslinking agent, a crosslinking agent known or commonly used in the PSA field can be used. Examples include epoxy-based crosslinking agents, isocyanate-based crosslinking agents, silicone-based crosslinking agents, oxazoline-based crosslinking agents, aziridine-based crosslinking agents, silane-based crosslinking agents, alkyletherified melamine-based crosslinking agent, metal chelate-based crosslinking agent, and the like. These can be used singly as one species or in combination of two or more species.

The crosslinking agent content (when two or more species of crosslinking agent are included, their combined amount) is not particularly limited. From the standpoint of obtaining a PSA having well-balanced adhesive properties such as adhesive strength, cohesive strength, etc., the crosslinking agent content is usually preferably about 5 parts by weight or less relative to 100 parts by weight of the monomeric components in the PSA composition, preferably about 0.001 to 5 parts by weight, more preferably about 0.001 to 4 parts by weight, or still more preferably about 0.001 to 3 parts by weight. Alternatively, the PSA composition may be free of such a crosslinking agent.

((Meth)Acrylic Oligomer)

From the standpoint of increasing the adhesive strength, etc., the PSA composition disclosed herein can comprise a (meth)acrylic oligomer. For the (meth)acrylic oligomer, it is preferable to use a polymer having a higher Tg value than the Tg value of the copolymer corresponding to the composition of the monomeric components (which typically, approximately corresponds to the Tg value of the (meth)acrylic polymer contained in PSA formed from the PSA composition). The inclusion of the (meth)acrylic oligomer can increase the adhesive strength of the PSA.

The (meth)acrylic oligomer desirably has a Tg of about 0° C. to about 300° C., preferably about 20° C. to about 300° C., or more preferably about 40° C. to about 300° C. When the Tg falls within these ranges, the adhesive strength can be preferably increased. The Tg value of the (meth)acrylic oligomer is determined by the Fox equation, similarly to the Tg of the copolymer corresponding to the composition of the monomeric components.

The (meth)acrylic oligomer may have a weight average molecular weight (Mw) of about 1,000 or larger, but smaller than about 30,000, preferably about 1,500 or larger, but smaller than about 20,000, or more preferably about 2,000 or larger, but smaller than about 10,000. A weight average molecular weight within these ranges is preferable in obtaining good adhesive strength and good holding properties. The weight average molecular weight of a (meth)acrylic oligomer can be determined by gel permeation chromatography (GPC) as a value based on standard polystyrene. More specifically, it can be determined with HPLC 8020 available from Tosoh Corporation, using two TSKgel GMH-H (20) columns and tetrahydrofuran as an eluent at a flow rate of about 0.5 ml/min.

Examples of monomers forming the (meth)acrylic oligomer include alkyl (meth)acrylate such as methyl (meth) acrylate, ethyl (meth)acrylate, propyl (meth)acrylate, isopropyl (meth)acrylate, butyl (meth)acrylate, isobutyl (meth) acrylate, sec-butyl (meth)acrylate, tert-butyl (meth)acrylate, pentyl (meth)acrylate, isopentyl (meth)acrylate, hexyl (meth)acrylate, 2-ethylhexyl (meth)acrylate, heptyl (meth) acrylate, octyl (meth)acrylate, isooctyl (meth)acrylate, nonyl (meth)acrylate, isononyl (meth)acrylate, decyl (meth) acrylate, isodecyl (meth)acrylate, undecyl (meth)acrylate, and dodecyl (meth)acrylate; an ester of (meth)acrylic acid and an alicyclic alcohol, such as cyclohexyl (meth)acrylate, isobornyl (meth)acrylate, and dicyclopentanyl (meth)acrylate; aryl (meth)acrylate such as phenyl (meth)acrylate and benzyl (meth)acrylate; and a (meth)acrylate derived from a terpene compound derivative alcohol. These (meth)acrylates may be used solely as one species or in combination of two or more species.

From the standpoint of further increasing the adhesiveness, the (meth)acrylic oligomer preferably comprises, as a monomer unit, an acrylic monomer having a relatively bulky structure, typified by an alkyl (meth)acrylate having a branched alkyl group, such as isobutyl (meth)acrylate, tert-butyl (meth)acrylate, etc.; an ester of a (meth)acrylic acid and an alicyclic alcohol, such as cyclohexyl (meth)acrylate, isobornyl (meth)acrylate, dicyclopentanyl (meth)acrylate, etc.; or an aryl (meth)acrylate such as phenyl (meth)acrylate, benzyl (meth)acrylate, etc. When UV light is used in synthesizing the (meth)acrylic oligomer or forming the PSA layer, a saturated oligomer is preferable because it is less likely to inhibit polymerization. An alkyl (meth)acrylate having a branched alkyl group or an ester of an alicyclic alcohol is preferably used as a monomer constituting the (meth)acrylic oligomer.

From these points of view, preferable examples of the (meth)acrylic oligomer include the respective homopolymers of dicyclopentanyl methacrylate (DCPMA), cyclohexylmethacrylate (CHMA), isobornyl methacrylate (IBXMA), isobornyl acrylate (IBXA), dicyclopentanyl acrylate (DCPA), 1-adamanthyl methacrylate (ADMA), and 1-adamanthyl acrylate (ADA); as well as a copolymer of CHMA and isobutyl methacrylate (IBMA), a copolymer of CHMA and IBXMA, a copolymer of CHMA and acryloyl morpholine (ACMO), a copolymer of CHMA and diethylacrylamide (DEAA), a copolymer of ADA and methyl methacrylate (MMA), a copolymer of DCPMA and IBXMA, a copolymer of DCPMA and MMA, etc.

The (meth)acrylic oligomer content, if any, in the PSA composition is not particularly limited. From the standpoint of increasing the likelihood of obtaining a PSA layer having a preferable storage modulus disclosed herein, the (meth) acrylic oligomer content is preferably about 20 parts by weight or less relative to 100 parts by weight of the monomeric components in the PSA composition, more preferably about 15 parts by weight or less, or even more preferably about 10 parts by weight or less. The art disclosed herein can be implemented preferably also in an embodiment using no (meth)acrylic oligomers.

Besides these, the PSA composition disclosed herein may comprise various additives known in the PSA field as necessary. Depending on the application, suitable additives can be added, for example, colorant such as dye and pigment, antistatic agent, surfactant, plasticizer, tackifier resin, surface lubricant, leveling agent, softener, antioxidant, anti-aging agent, photostabilizer, UV absorber, polymerization inhibitor, inorganic or organic filler, metal in a form of powder, particles or foil, etc.

In the art disclosed herein, as the PSA composition used for forming the PSA layer, an active energy ray-curable PSA composition (typically a light-curing PSA composition) can be preferably used. From the standpoint of the environmental hygiene, etc., a composition essentially free of an organic solvent is preferable. For instance, a PSA composition having about 5% by weight or less (more preferably about 3% by weight or less, e.g. about 0.5% by weight or less) organic solvent content is preferable. A PSA composition essentially free of a solvent (meaning to include an organic solvent and an aqueous solvent) is preferable because it is suitable for forming a PSA layer in an embodiment where a liquid layer of the PSA composition is cured between a pair of release films as described later. For instance, a preferable PSA composition has a solvent content of about 5% by weight or less (more preferably about 3% by weight or less, e.g. about 0.5% by weight or less). The solvent herein refers to a volatile component that should be eliminated in the process of forming the PSA layer, that is, a volatile component that is not to be a component of the final PSA layer formed.

<Production Method of PSA sheet>

The method for producing the PSA sheet disclosed herein is not particularly limited. For instance, a PSA composition disclosed herein is applied to a release face of a release film, allowed to dry or cure to form a PSA layer, whereby a substrate-free double-faced PSA sheet can be obtained. The PSA layer thus formed on the release film can be adhered (transferred) to a non-releasable face of a support substrate to obtain a substrate-supported single-faced PSA sheet. In another method for producing the substrate-supported single-faced PSA sheet, the PSA composition is directly applied to the non-releasable face of the support substrate and allowed to dry or cure. The substrate-supported double-faced PSA sheet can be produced by a method that transfers a PSA layer formed on a release film to a support substrate, a method that directly applies the PSA composition to a support substrate and allows it to dry or cure, a method that combines these, etc.

The PSA composition can be applied by various known methods. Specific examples include methods such as roll coating, kiss roll coating, gravure coating, reverse coating, roll brush coating, spray coating, dip roll coating, bar coating, knife coating, air knife coating, curtain coating, lip coating, and extrusion coating with a die coater or the like.

The PSA sheet disclosed herein can be preferably produced by a method that includes allowing a liquid layer of the PSA composition on a release face of a release film to dry or cure to form a PSA layer in which the face cured on the release face is a first adhesive face. This method allows more precise control of the smoothness of the PSA layer surface formed in contact with the release face by means of drying or curing a fluid PSA composition (liquid layer) in contact with the release face. For instance, with the use of a release film having a suitably smooth release face, the first adhesive face can be consistently (reproducibly) produced to have desirable smoothness.

The PSA sheet disclosed herein can be preferably produced by a method that includes allowing a liquid layer of the PSA composition to cure between release faces of a pair of release films to form a PSA layer. This method is preferable as a method for producing a substrate-free double-faced PSA sheet in which the 10-point mean roughness of the first adhesive face and the 10-point mean roughness of the second adhesive face are both in the preferable ranges disclosed herein. By adhering the substrate-free double-faced PSA sheet thus obtained to a non-releasable face of a support substrate, it can be preferably applied to production of a substrate-supported single-faced PSA sheet and a substrate-supported double-faced PSA sheet. As the method for placing the liquid layer of the PSA composition between release faces of a pair of release films, it is possible to use a method that applies the fluid PSA composition to a release face of the first release film and then covers the liquid layer of the PSA composition with the second release film. In another method cited, the first and second release films are placed between a pair of rolls, with their release faces facing each other; and the fluid PSA composition is supplied between their release faces. The PSA composition is applied preferably at or below 80° C., or more preferably at or below 60° C. (e.g. at or below 40° C.). This can inhibit roughening of the PSA layer caused by a difference in coefficient of thermal expansion between the release film and the PSA layer, allowing formation of a yet smoother adhesive face.

The gel fraction of the PSA layer disclosed herein is not particularly limited. It is usually preferably about 99.5% by weight or lower, more preferably about 20 to 99.5% by weight, or yet more preferably about 50 to 99.5% by weight. When the PSA composition comprises a crosslinking agent, the gel fraction can be controlled by adjusting the amount of crosslinking agent added in view of the effect of the temperature and time of the crosslinking treatment.

The PSA layer constituting the PSA sheet disclosed herein preferably has, but not particularly limited to, a haze value of 2% or lower when having a thickness of 50 µm. When the PSA layer is used for optical applications, it is particularly meaningful that the haze value is at or below 2%. The haze value of the PSA layer is preferably 0 to 1.5%, or more preferably 0 to 1%. The PSA layer formed to have a thickness of about 50 µm can be applied to a face of an alkali glass plate and measured for haze value using a haze meter. As the haze meter, MR-100 available from Murakami Color Research Laboratory Co., Ltd., or an equivalent device can be used. For the measurement, an alkali glass plate to which the PSA layer is adhered is arranged so that the PSA layer side is closer to the light source. When the alkali glass itself has a haze value, the haze value of the PSA layer is the value obtained by subtracting the haze value of the alkali glass by itself from the measured value.

<Release Film>

The release film in the art disclosed herein is not particularly limited and can be suitably selected in accordance with the purpose. Non-limiting examples of the release film that can be used include a release film having a release layer on one or each surface of a release film substrate, with the surface of the release layer being a release face; and a release film formed from a low-adhesive resin such as a fluorine-based polymer (polytetrafluoroethylene, etc.) and a polyolefin-based resin (polyethylene, polypropylene, etc.). As the release film substrate, plastic film, paper (possibly resin-impregnated paper, resin-laminated paper, etc.) and the like can be used. The release layer can be formed by subjecting the release film substrate to a surface treatment with a release agent. Examples of the release agent include a silicone-based release agent, long-chain alkyl-based release agent, fluorine-based release agent, molybdenum(IV) sulfide, etc. In an embodiment, a release film having a release layer formed with a silicone-based release agent can be preferably used.

As the release film disclosed herein, a species having a release layer on a surface of a plastic film as the release film substrate can be preferably used. The material for forming such plastic film can be selected at will among materials similar to the materials exemplified as the plastic film used for the support substrate. From the standpoint of the size-stability and strength, a plastic film comprising a polyester-based resin film (typically a polyethylene terephthalate film) can be preferably used. A preferable plastic film is transparent at least in some areas.

In the art disclosed herein, the plastic film used as the aforementioned support substrate or release film substrate may be a non-stretched film, uni-axially stretched film or bi-axially stretched film. The plastic film may have a single-layer structure or a multi-layer structure including two or more sublayers. The plastic film may include a known additive that can be used for support substrates or release film substrates of PSA sheets, such as antioxidant, anti-aging agent, heat resistant stabilizer, photostabilizer, UV ray absorber, colorant such as pigment and dye, slip agent, filler, antistatic agent, nucleating agent, etc. In a multi-layer plastic film, each additive can be added in each sublayer or in some sublayers.

As the release film in the art disclosed herein, a release film that has a release layer on a surface of a plastic film (release film substrate) and is free of particles or comprises particles having diameters of 5 µm or smaller can be preferably used. Particles (especially inorganic particles) having diameters larger than 5 µm in the release film may reduce the smoothness of the release face in the release film in a free state. As for a release film comprising particles larger than 5 µm in diameter, even if it is highly smooth in the free state, bending deformation, extensional deformation, compression in the thickness direction and so on of the release film may cause the particles to emerge from the release film, thereby lowering the smoothness of the release face or even the smoothness of the adhesive face in contact with the release face. In an embodiment disclosed herein, may be used a release film essentially free of particles larger than 5 µm in diameter, that is, a release film that includes no particles larger than 5 µm in diameter unless due to non-intentional inclusion of a foreign substance and so on.

The particles larger than 5 µm in diameter can be, for instance, inorganic particles that can be added to release film substrates as a slip agent, pigment, filler, etc. Non-limiting examples of such inorganic particles may include silica, alumina, kaolin, talc, mica, calcium carbonate, etc.

The thickness of the release film is not particularly limited. In view of the balance between the strength and flexibility, it is usually preferable to use a release film having a thickness of about 10 µm to about 500 µm. From the standpoint of inhibiting roughening of the adhesive face caused by an external force through the release film (e.g. roughening caused by a foreign substance (possibly included while a release film-supported PSA sheet is wound in a roll) being pushed against the adhesive face through the release film), the release film has a thickness of usually preferably about 20 µm or greater, or more preferably about 25 µm or greater (e.g. about 30 µm or greater). From the standpoint of the handling properties (e.g. the ease of winding) of the release film itself or the release film-supported PSA sheet, the thickness of the release film is usually suitably about 250 µm or less, or preferably about 125 µm or less (e.g. about 100 µm or less), or more preferably about 80 µm or less. In an embodiment, a release film of about 75 µm or less (e.g. about 50 µm or less) in thickness can be preferably used.

In the release film-supported PSA sheet disclosed herein, the release face of the first release film in contact with the first adhesive face of the PSA sheet can have a 10-point mean roughness ($Rz_{R1}$) of, for instance, about 2000 nm or less. From the standpoint of inhibiting roughening of the first adhesive face during the storage of the release film-supported PSA sheet, $Rz_{R1}$ is suitably about 1500 nm or less, preferably about 1000 nm or less, more preferably about 500 nm or less, or yet more preferably about 300 nm or less (e.g. about 250 nm or less). When the first adhesive face is a surface of a PSA layer formed from a fluid PSA composition on the release face of the first release film, as the first release film, it is preferable to use a release film having an $Rz_{R1}$ of about 1200 nm or less (typically about 700 nm or less, more preferably about 500 nm or less, or yet more preferably about 400 nm or less, e.g. about 300 nm or less). The lower limit of $Rz_{R1}$ is not particularly limited. From the standpoint of the ease of production and handling properties of the first release film, etc., in an embodiment, a first release film having an $Rz_{R1}$ of about 50 nm or greater (e.g. about 100 nm or greater) can be preferably used.

When the release film-supported PSA sheet disclosed herein is in an embodiment of the release film-supported double-faced PSA sheet comprising a double-faced PSA sheet, first release film and second release film, the 10-point mean roughness ($Rz_{R2}$) of the release face of the second release film in contact with the second adhesive face of the double-faced PSA sheet can be, but not particularly limited to, for instance, about 3000 nm or greater. In an embodiment, a second release film having an $Rz_{R2}$ of less than about 3000 nm (preferably about 2000 nm or less) can be preferably used. In an embodiment where the second adhesive face has a 10-point mean roughness $Rz_{A2}$ of 1000 nm or less, from the standpoint of inhibiting roughening of the second adhesive face, $Rz_{R2}$ is suitably about 2000 nm or less (typically about 1500 nm or less, preferably about 1000 nm or less, more preferably about 500 nm or less, or yet more preferably about 300 nm or less, e.g. about 250 nm or less). When the second adhesive face is a surface of a PSA layer formed from a fluid PSA composition on the release face of the second release film, as the second release film, it is preferable to use a release film having an $Rz_{R2}$ of about 1200 nm or less (typically about 700 nm or less, more preferably about 500 nm or less, or yet more preferably about 400 nm or less, e.g. about 300 nm or less). The lower limit of $Rz_{R2}$ is not particularly limited. In an embodiment, a second release film having an $Rz_{R2}$ of about 50 nm or greater (e.g. about 100 nm or greater) can be preferably used.

In the art disclosed herein, the release face of the release film constituting the release film-supported PSA sheet is preferably nearly as smooth as the adhesive face with which the release face is in contact. This more greatly inhibits a change in smoothness of the adhesive face while the release film-supported PSA sheet is in storage and tends to increase the performance stability of the PSA sheet. In the release film-supported PSA sheet according to an embodiment, the difference in 10-point mean roughness between the first adhesive face and the release face in contact with this—that is, $|Rz_{R1}-Rz_{A1}|$—can be about 300 nm or less (e.g. about 250 nm or less), preferably about 150 nm or less, or more preferably about 100 nm or less. From the standpoint of the performance stability of the PSA sheet, the 10-point mean roughness of the first adhesive face is less than the 10-point mean roughness of the first release face. In other words, it preferably satisfies $Rz_{A1}<Rz_{R1}$. The release film-supported PSA sheet that satisfies at least either one (preferably both) of the $|Rz_{R1}-Rz_{A1}|$ value and the inequality $Rz_{A1}<Rz_{R1}$ can be preferably produced by a method that includes allowing a liquid layer of the PSA composition to dry or cure on the release face of the first release film constituting the release film-supported PSA sheet.

When the release film-supported PSA sheet disclosed herein is in a form of release film-supported double-faced PSA sheet comprising a double-faced PSA sheet, first release film and second release film, in an embodiment, the difference in 10-point mean roughness between the second adhesive face and the second release face in contact therewith—i.e. $|Rz_{R2}-Rz_{A2}|$—can be about 300 nm or less (e.g. about 250 nm or less), preferably about 150 nm or less, or more preferably about 100 nm or less. From the standpoint of the performance stability of the PSA sheet, the 10-point mean roughness of the second adhesive face is preferably less than the 10-point mean roughness of the second release face. In other words, it preferably satisfies $Rz_{A2}<Rz_{R2}$. A release film-supported PSA sheet that satisfies at least one (preferably both) of the $|Rz_{R2}-Rz_{A2}|$ value and the inequality $Rz_{A2}<Rz_{R2}$ can be preferably produced, as described later, by a method that includes allowing a liquid layer of the PSA composition to cure between the release face of the first release film and the release face of the second release film.

There are no particular limitations to the smoothness of the back face (opposite from the release face) of the release film constituting the release film-supported PSA sheet. In the release film-supported PSA sheet that can be wound in a roll, from the standpoint of preventing roughening of the adhesive face caused by irregularities in the back face while in the wound form, it is preferable that the back face of the release film has a 10-point mean roughness of about 5000 nm or less (preferably about 4000 nm or less, e.g. about 3000 nm or less).

The PSA sheet disclosed herein (possibly the PSA sheet included in the release-film-supported PSA sheet, the same applies hereinafter) can be preferably used in an embodiment where the release film on the first adhesive face is replaced with another release film before the PSA sheet is applied to an adherend. Hereinafter, the release film for replacement is also called a "replacement film." There are no particular limitations to the 10-point mean roughness ($Rz_{E1}$) of the first release face (i.e. the release face placed to make contact with the first adhesive face) of the replacement film. It can be, for instance, about 50 nm or greater (typically about 100 nm or greater). In an embodiment, a replacement film having an $Rz_{E1}$ of greater than about 250 nm (more preferably greater than about 500 nm, e.g. greater than about 700 nm) can be preferably used. The PSA sheet disclosed herein may produce a significant effect to inhibit roughening of the first adhesive face even in an embodiment of the use where a replacement film having an $Rz_{E1}$ of about 1000 nm or greater (or even about 1200 nm or greater, e.g. about 1500 nm or greater) is used. The upper limit of $Rz_{E1}$ is not particularly limited. Usually, a replacement film having an $Rz_{E1}$ of about 3000 or less (typically about 2000 or less) can be preferably used. In an embodiment, the replacement film may have an $Rz_{E1}$ of about 1500 nm or less, or even about 1000 nm or less. The replacement film may have the same constitution (material, thickness, surface roughness, etc.) as the replaced release film (release film before the replacement) or different constitution.

In a preferable embodiment, as the replacement film, a film having an $Rz_{E1}$ greater than the 10-point mean roughness ($Rz_{R1}$) of the first release face of the release film prior to the replacement (which may be the original release film) can be used. In an embodiment, a replacement film having an $Rz_{E1}/Rz_{R1}$ value of about 2 or greater (preferably about 3 or greater) can be used. The PSA sheet disclosed herein may produce a significant effect to inhibit roughening of the first adhesive face even in an embodiment of the use where a replacement film having an $Rz_{E1}/Rz_{R1}$ of about 5 or greater (or even about 7 or greater) is used. The upper limit of $Rz_{E1}/Rz_{R1}$ is not particularly limited. It is usually suitably about 20 or less (typically 15 or less, e.g. about 10 or less).

<Applications>

The PSA layer or PSA sheet disclosed herein has highly smooth adhesive face(s) and is less susceptible to roughening of the adhesive face(s); and thus is preferable for optical applications. For instance, it is useful as an adhesive optical component using an optical material as the support substrate. Such an adhesive optical component can be thought as a substrate-supported single-faced PSA sheet in an embodiment having an optical component as the support substrate on the first adhesive face or second adhesive face of a double-faced PSA sheet disclosed herein. In a preferable embodiment, it has the optical component on the second adhesive face. In this embodiment, a release film-supported adhesive optical component can be constructed, having a release film on the first adhesive face.

When using an optical film as the optical material, the adhesive optical component is used as an optical film with a PSA layer. Examples of the optical film include a polarizing plate, retardation plate, optical compensation film, brightness enhancement film, hard coat (HC) film, anti-glare film, impact-absorbing film, antifouling film, photochromic film, light control film, wavelength-selective absorbing film, wavelength conversion film, a laminate of these, and the like. The PSA layer or PSA sheet disclosed herein is preferable also for applications in the ophthalmic field. The PSA layer or PSA sheet of the present invention is not limited to optical applications or ophthalmic applications as described above. For instance, it can be applied for various purposes, in a form of a PSA sheet that uses a general antifouling film, thermal insulation film, impact-absorbing film, etc., as the support.

The matters disclosed in this description include the following:

(1) A PSA sheet comprising a PSA layer, wherein
the PSA sheet has a first face and a second face,
the first face is a first adhesive face formed of one face of the PSA layer,
the first adhesive face has a 10-point mean roughness ($Rz_{A1}$) of about 1000 nm or less, and
the PSA layer has a 100° C. storage modulus ($G'_{100}$) of about 0.08 MPa or greater.

(2) The PSA sheet according to (1) above, wherein the PSA layer has a ratio of 100° C. storage modulus ($G'_{100}$) to 23° C. storage modulus ($G'_{23}$) of about 35% or greater.

(3) The PSA sheet according to (1) or (2) above, wherein the PSA layer has a 23° C. storage modulus ($G'_{23}$) of less than about 0.30 MPa.

(4) The PSA sheet according to any of (1) to (3) above constructed as a double-faced PSA sheet whose second face is the second adhesive face.

(5) The PSA sheet according to (4) above, wherein the second adhesive face has a 10-point mean roughness ($Rz_{A2}$) of about 2000 nm or less (e.g. about 1000 nm or less).

(6) The PSA sheet according to (4) or (5) above, wherein the second adhesive face is formed of the other surface of the PSA layer.

(7) The PSA sheet according to any of (4) to (6) above, wherein the first adhesive face has a 10-point mean roughness ($Rz_{A1}$) and the second adhesive face has a 10-point mean roughness ($Rz_{A2}$), with either one of the two being about 500 nm or less.

(8) The PSA sheet according to any of (4) to (7) above, wherein each of the 10-point mean roughness ($Rz_{A1}$) of the first adhesive face and the 10-point mean roughness ($Rz_{A2}$) of the second adhesive face is about 500 nm or less.

(9) The PSA sheet according to any of (4) to (8) above, wherein the 10-point mean roughness ($Rz_{A1}$) of the first adhesive face and the 10-point mean roughness ($Rz_{A2}$) give rise to a difference ($|Rz_{A1}-Rz_{A2}|$) of about 250 nm or less.

(10) The PSA sheet according to any of (1) to (9) above, being a substrate-free double-faced PSA sheet formed of a single PSA layer.

(11) The PSA sheet according to any of (1) to (10) above, wherein the PSA layer comprises a (meth)acrylic polymer accounting for more than 50% by weight of polymers in the PSA layer.

(12) The PSA sheet according to (11) above, wherein the (meth)acrylic polymer comprises, as a monomeric component constituting the (meth)acrylic polymer, a component (A), which is an alkyl (meth)acrylate having an alkyl group with 2 to 18 carbons at the ester end.

(13) The PSA sheet according to (11) or (12) above, wherein the component (A) accounts for about 30% by weight to about 70% by weight of all monomeric components.

(14) The PSA sheet according to any of (11) to (13) above, wherein the (meth)acrylic polymer further comprises, as another monomeric component constituting the (meth)acrylic polymer, a component (B), which is an alicyclic monomer.

(15) The PSA sheet according to any of (11) to (14) above, wherein the component (B) is at least one species selected from a group consisting of cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, isobornyl (meth)acrylate, and dicyclopentanyl (meth)acrylate.

(16) The PSA sheet according to any of (11) to (15) above, wherein the component (B) accounts for about 20% by weight to about 50% by weight of all monomeric components.

(17) The PSA sheet according to any of (11) to (16) above, wherein the (meth)acrylic polymer further comprises, as another monomeric component constituting the (meth)acrylic polymer, a component (C), which is a monomer having at least either a hydroxy group or carboxy group.

(18) The PSA sheet according to any of (11) to (17) above, wherein the component (C) accounts for about 15% by weight to about 30% by weight of all monomeric components.

(19) The PSA sheet according to any of (11) to (18) above, wherein the (meth)acrylic polymer further comprises, as another monomeric component constituting the (meth)acrylic polymer, a polyfunctional monomer, with the polyfunctional monomer accounting for about 3% by weight or less of all monomeric components.

(20) The PSA sheet according to any of (11) to (19) above, wherein the (meth)acrylic polymer is a product of UV polymerization of the monomeric components.

(21) A method for producing the PSA sheet according to any of (11) to (20) above, the method including forming the PSA layer, using a PSA composition that comprises a polymer of at least some of the monomeric components.

(22) The PSA sheet production method according to (21) above, wherein the forming the PSA layer includes applying the PSA composition to a release face of a release film and allowing the PSA composition to dry or cure on the release face.

(23) The PSA sheet production method according to (21) or (22) above, wherein the PSA composition comprises about 5% by weight or less of an organic solvent.

(24) The PSA sheet production method according to any of (21) to (23) above, wherein the forming the PSA layer includes allowing a liquid layer of the PSA composition to cure between release faces of a pair of release films to form the PSA layer.

(25) A release film-supported PSA sheet comprising the PSA sheet according to any of (1) to (20) above and a first release film placed on the first adhesive face.

(26) A release film-supported PSA sheet comprising the PSA sheet according to any of (4) to (20) above, a first release film placed on the first adhesive face, and a second release film placed on the second adhesive face.

(27) The release film-supported PSA sheet according to (25) or (26) above, wherein the first release film has a release face that is in contact with the first adhesive face and has a 10-point mean roughness ($Rz_{A1}$) and the first adhesive face has a 10-point mean roughness ($Rz_{A1}$), with the $Rz_{R1}$ and $Rz_{A1}$ giving rise to a difference of about 250 nm or less.

(28) The release film-supported PSA sheet according to (26) or (27) above, satisfying inequalities $Rz_{A1}<Rz_{R1}$ and $Rz_{A2}<Rz_{R2}$.

(29) The release film-supported PSA sheet according to any of (25) to (28) above, wherein the first release film comprises at least one inorganic particle species selected from a group consisting of silica, alumina, kaolin, talc, mica and calcium carbonate.

(30) The release film-supported PSA sheet according to any of (25) to (29) above, wherein the first release film has a thickness of about 10 µm or more, but about 500 µm or less (preferably about 20 µm or more, but about 100 µm or less. more preferably about 25 µm or more, but about 80 µm or less).

(31) An adhesive optical component comprising the PSA sheet according to any of (4) to (20) above and an optical part placed on the second adhesive face of the PSA sheet.

(32) A method for producing a PSA sheet-equipped article, the method comprising:
obtaining the release film-supported PSA sheet according to any of (26) to (30) above,
removing the first release film from the first adhesive face, and to the exposed first adhesive face, a release face of an another release film is adhered; and
applying the second adhesive face to an article as an adherend.

(33) The method for producing the PSA sheet-equipped article according to (32) above, using as the another release film, a release film having a release face with a 10-point mean roughness ($Rz_{E1}$) greater than the 10-point mean roughness ($Rz_{R1}$) of the release face where the first release film is in contact with the first adhesive face.

EXAMPLES

Several working examples relating to the present invention are described below although the present invention is not to be limited to these examples.
<Preparation of PSA Compositions>
(PSA Composition C1)

Were mixed 40 parts by weight of n-butyl acrylate, 41 parts by weight of cyclohexyl acrylate, 19 parts by weight of 4-hydroxybutyl acrylate, and 0.05 part by weight of 2,2-dimethoxy-1,2-diphenylethane-1-one (available from BASF Corporation, trade name "IRGACURE 651") and 0.05 part by weight of 1-hydroxycyclohexyl phenyl ketone (available from BASF Corporation, trade name "IRGACURE 184") as photopolymerization initiators. The mixture was irradiated with UV rays in a nitrogen atmosphere to prepare a partially-polymerized product (monomer syrup). To the resulting monomer syrup, 0.1 part by weight of 1,6-hexanediol diacrylate was added and evenly mixed to prepare a PSA composition C1.
(PSA Compositions C2~C4)

In preparation of the PSA composition C1, the amount of 1,6-hexanediol diacrylate was changed to 0.3 part, 0.05 part and 0 part by weight in PSA compositions C2, C3 and C4, respectively. Otherwise, in the same manner as the preparation of the PSA composition C1, PSA compositions C2 to C4 were prepared.

These PSA compositions C1 to C4 are all non-solvent-type compositions. Specifically, the solvent content in each of the PSA compositions C1 to C4 is less than 5% by weight, more specifically less than 1% by weight.
<Fabrication of PSA Sheets>

Release films R1 to R3 were obtained, R1 having a release layer treated with a silicone-based release agent A1 on one face of a 38 µm thick polyethylene terephthalate (PET) film F1 with the release face (the surface of the release layer) having a 10-point mean roughness of 211 nm, R2 having a release layer treated with the silicone-based release agent A1 on one face of a 38 µm thick PET film F2 with the release face having a 10-point mean roughness of 1610 nm, and R3 having a release layer treated with a silicone-based release agent A2 on one face of the PET film F2 with the release face having a 10-point mean roughness of 1610 nm. The release face of the release film R3 was formed to have greater peel strength relative to the PSA layer as compared with the release faces of the release films R1 and R2. Using these release films, PSA sheets were fabricated as described below.

The 10-point mean roughness values of the respective release faces of the release films R1, R2 and R3 are the measurement values obtained in the same manner as the surface smoothness measurement of the first adhesive face described later, except that the back face (non-release-treated face) of each release film was placed on and adhered to a glass slide 51112 No. 2 (available from Matsunami Glass Ind., Ltd.) with a drop of water placed with a dropper.

Example 1

The PSA composition C1 prepared above was applied to the release face of the release film R1 to form a liquid layer of the PSA composition on the release face. The amount of the PSA composition applied was adjusted so that the thickness of the final PSA layer was 50 µm. Subsequently, the liquid layer was covered with the release film R3 with the release face of the release film R3 being in contact with the liquid layer. By this, the liquid layer was blocked from oxygen. With the two faces (first and second faces) of the liquid layer of the PSA composition C1 being in contact with the release faces of the release films R1 and R3, respectively, the resultant was irradiated with UV rays at an irradiance of 5 mW/cm² for 360 seconds using a chemical light lamp (available by Toshiba Corporation) to carry out polymerization to cure the liquid layer to form a PSA layer, whereby a PSA sheet S1 formed of the PSA layer (i.e. the UV-cured product of the liquid layer) of Example 1 was obtained. The PSA sheet S1 forms a release film-supported PSA sheet in which its first face (first adhesive face) and second face (second adhesive face) are in contact with the release faces of the release films R1 and R3 used in the fabrication of the PSA sheet S1, respectively.

The irradiance value was measured with an industrial UV checker (available from Topcon Corporation, trade name "UVR-T1" with light detector model number "UD-T36") with peak sensitivity at 350 nm in wavelength.

Examples 2, 3

In place of the PSA composition C1, PSA compositions C2 and C3 were used, respectively. Otherwise, in the same manner as in the fabrication of the PSA sheet S1 according to Example 1, PSA sheets S2 and S3 according to Examples 2 and 3 were obtained. The PSA sheets S2 and S3 form release film-supported PSA sheets in which their respective first adhesive faces and second adhesive faces are in contact with the release faces of the release films R1 and R3 used in the fabrication of these PSA sheets.

Comparative Example 1

The release film R2 was used in place of the release film R1 in the fabrication of the PSA sheet S2 according to Example 2. In particular, the PSA composition C2 was applied to the release face of the release film R2 to form a liquid layer of the PSA composition and the liquid layer was covered with the release film R3 with the release face of the release film being in contact with the liquid layer. With the two faces of the liquid layer of the PSA composition C2 being in contact with the release faces of the release films R2 and R3, respectively, the resultant was irradiated with UV rays. Otherwise, in the same manner as Example 2, a PSA sheet S4 according to Comparative Example 1 was obtained. The PSA sheet S4 forms a release film-supported PSA sheet in which its first adhesive face and second adhesive face are in contact with the release faces of the release films R2 and R3 used in the fabrication of the PSA sheet S1, respectively.

Comparative Example 2

Using the PSA composition C4 in place of the PSA composition C1, otherwise in the same manner as in the fabrication of the PSA sheet S1 according to Example 1, a PSA sheet S5 according to Comparative Example 2 was obtained. The PSA sheet S5 forms a release film-supported PSA sheet in which its first adhesive face and second adhesive face are in contact with the release faces of the release films R1 and R3 used in the fabrication of the PSA sheet S5, respectively.

The PSA sheets according to the respective examples were stored in the forms of release film-supported PSA sheets for seven days in an environment at 23° C. and 50% RH; and then subjected to the following measurements and tests.

<Measurement of Storage Modulus>

Pieces of the PSA sheet (about 50 μm thick PSA layer) according to each example were stacked to form an about 2 mm thick PSA layer. A disc of 7.9 mm diameter was punched out of the resulting PSA layer to prepare a specimen. The specimen was placed between parallel plates and subjected to viscoelasticity measurements under the conditions shown below, using a viscoelasticity testing system (a TA Instruments product, ARES) to determine the 23° C. storage modulus ($G'_{23}$) and 100° C. storage modulus ($G'_{100}$).
Measurement mode: shear mode
Temperature range: −70° C. to 150° C.
Rate of heating: 5° C./min
Measurement frequency: 1 Hz <Initial 10-Point Mean Roughness of First Adhesive Face>

In an environment at 23° C. and 50% RH, the release film was removed from the second adhesive face of the PSA sheet according to each example and the exposed second adhesive face was adhered to a glass slide S1112 No. 2 (available from Matsunami Glass Ind., Ltd.). Subsequently, from the first adhesive face of the PSA sheet adhered on the glass slide, the release film was peeled by hand at a peel rate of about 10 m/min in the 180° direction and the exposed first adhesive face was measured for 10-point mean roughness with an interferometric surface roughness analyzer (available from Veeco, Wyko NT-9100). The measurement was taken within 10 minutes after the release film was removed from the first adhesive face. The measurement conditions are shown below.
Surface area measure per run: 622 μm×467 μm
(Object lens: ×10, FOV (internal lens): ×1.0)
Measurement mode: VSI (vertical scan interferometry)
Back scan: 5 μm
Distance measured: 10 μm
Threshold: 0.1%
Scanning speed: ×1 (single scan)

From the data set obtained by the measurement, the highest mountain within the measured area was picked and the altitude at its mountain top was recorded as H1. An 11 pixel by 11 pixel range surrounding H1 was masked and the highest mountain was picked in areas excluding the masked range and the altitude at its mountain top was recorded as H2. This operation was repeated to identify H3 to H10. Thus, the altitudes (H1 to H10) of the 10 highest mountains were determined. Similarly, the altitudes (L1 to L10) of the 10 lowest valleys within the measured area were determined at their bottoms. From these values, Rz was determined by an equation below. In the equation, $H_j$ represents the height (altitude) of each mountain top and $L_j$ represents the depth (altitude) of each valley.

$$R_z = \frac{1}{10}\left[\sum_{j=1}^{10} H_j - \sum_{j=1}^{10} L_j\right]$$

Five runs of the measurement were carried out (i.e. N=5) and their average value was determined.

10-Point Mean Roughness of First Adhesive Face after Replacement of Release Film Experiment 1

In an environment at 23° C. and 50% RH, from the first adhesive face of the PSA sheet S1 of Example 1, the release film R1 was peeled by hand at a peel rate of about 10 m/min in the 180° direction. To the exposed first adhesive face, another piece of release film R1 was immediately adhered with a 2 kg roller moved back and forth once at a speed of about 300 mm/min. In this manner, the release film R1 protecting the first adhesive face of the PSA sheet of Example 1 was replaced (exchanged) with the other piece of release film R1. This was stored for two hours in an environment at 23° C. and 50% RH. The replacement release film R1 was peeled by hand at a peel rate of about 10 m/min in the 180° direction and the exposed first adhesive face was measured for 10-point mean roughness in the same manner as above.

Experiment 2

In this experiment, the release film R1 on the first adhesive face of the PSA sheet S2 in Example 2 was replaced with the release film R2. Otherwise in the same manner as Experiment 1, the replacement release film R2 was removed and the exposed first adhesive face was measured for 10-point mean roughness.

Experiment 3

In this experiment, the release film R1 on the first adhesive face of the PSA sheet S3 in Example 3 was replaced with the release film R2. Otherwise in the same manner as Experiment 1, the replacement release film R2 was removed and the exposed first adhesive face was measured for 10-point mean roughness.

Experiment 4

In this experiment, the release film R1 on the first adhesive face of the PSA sheet S4 in Comparative Example 1 was replaced with the release film R2. Otherwise in the same manner as Experiment 1, the replacement release film R2 was removed and the exposed first adhesive face was measured for 10-point mean roughness.

Experiment 5

In this experiment, the release film R2 on the first adhesive face of the PSA sheet S4 in Comparative Example 1 was replaced with the release film R1. Otherwise in the same manner as Experiment 1, the replacement release film R1 was removed and the exposed first adhesive face was measured for 10-point mean roughness.

Experiment 6

In this experiment, the release film R2 on the first adhesive face of the PSA sheet S5 in Comparative Example 2 was replaced with another piece of release film R2. Otherwise in the same manner as Experiment 1, the replacement release film R2 was removed and the exposed first adhesive face was measured for 10-point mean roughness.

The results are shown in Table 1.

TABLE 1

| Experiment | | 1 | 2 | 3 | 4 | 5 | 6 |
|---|---|---|---|---|---|---|---|
| PSA sheet | | S1 | S2 | S3 | S4 | S4 | S5 |
| Storage modulus | $G'_{100}$ (MPa) | 0.09 | 0.13 | 0.08 | 0.13 | 0.13 | 0.07 |
| | $G'_{23}$ (MPa) | 0.22 | 0.20 | 0.22 | 0.20 | 0.20 | 0.23 |
| | $G'_{100}/G'_{23}$ | 41% | 65% | 36% | 65% | 65% | 30% |
| 10-pt mean roughness (nm) 1st adhesive face/1st release face | Initial | 127/211 | 153/211 | 135/211 | 1690/1610 | 1690/1610 | 173/211 |
| | After replaced | 114/211 | 210/1610 | 630/1610 | 1730/211 | 1780/1610 | 1140/1610 |

As shown in Table 1, it was been found that in the PSA sheets with the 10-point mean roughness of first adhesive face being 1000 nm or less, when the PSA layer constituting the first adhesive face had a 100° C. storage modulus of 0.08 MPa or greater, roughening of the first PSA layer caused by replacement of the release film was significantly inhibited. In the PSA sheet S4 initially having the rough first adhesive face, even after the replacement of the release film on the first adhesive face with a highly smooth piece, the smoothness of the first adhesive face did not increase.

Although specific embodiments of the present invention have been described in detail above, these are merely for illustrations and do not limit the scope of the claims. The art according to the claims includes various modifications and changes made to the specific embodiments illustrated above.

REFERENCE SIGNS LIST 1, 2 PSA sheets
1A first face (first adhesive face)
1B second face (second adhesive face)
2A first face (first adhesive face)
2B second face (non-adhesive face)
11 PSA layer
11A first surface
11B second surface
15 support substrate
15A first face
15B second face
21 first release film
21A surface (first release face)
21B back face
22 second release film
22A surface (second release face)
100, 200 PSA sheets on release film

The invention claimed is:

1. A release film-supported pressure-sensitive adhesive sheet comprising a pressure-sensitive adhesive sheet and a first release film,
wherein the pressure-sensitive adhesive sheet comprises a pressure-sensitive adhesive layer comprising a (meth)acrylic polymer accounting for more than 50% by weight of polymers in the pressure-sensitive adhesive layer,
the pressure-sensitive adhesive sheet has a first face and a second face,
wherein the (meth)acrylic polymer comprises, as a monomeric component constituting the (meth)acrylic polymer, a monomer having at least either a hydroxy group or a carboxy group, the monomer having at least either a hydroxy group or carboxy group accounting for 15% by weight to 30% by weight of all monomeric components, the first face is a first adhesive face formed of a first surface of the pressure-sensitive adhesive layer, the first adhesive face has a ten-point mean roughness of 1000 nm or less, the first release film is placed on the first adhesive face, the first release film has a first release face in contact with the first adhesive face and the first release face has a 10-point mean roughness of 1200 nm or greater, the pressure-sensitive adhesive layer has a 100° C. storage modulus of 0.08 MPa or greater, and the pressure-sensitive adhesive layer has a 23° C. storage modulus of 0.15 MPa or greater.

2. The release film-supported pressure-sensitive adhesive sheet according to claim 1, wherein the pressure-sensitive adhesive layer has a ratio of its 100° C. storage modulus to its 23° C. storage modulus of 35% or greater.

3. The release film-supported pressure-sensitive adhesive sheet according to claim 1, wherein the pressure-sensitive adhesive layer has a 23° C. storage modulus of less than 0.30 MPa.

4. The release film-supported pressure-sensitive adhesive sheet according to claim 1, wherein the (meth)acrylic polymer comprises, as a monomeric component constituting the (meth)acrylic polymer, an alkyl (meth)acrylate having an alkyl group with 2 to 18 carbons at the ester end.

5. The release film-supported pressure-sensitive adhesive sheet according to claim 4, wherein the alkyl (meth)acrylate having an alkyl group with 2 to 18 carbons at the ester end accounts for 30% by weight to 70% by weight of all monomeric components.

6. The release film-supported pressure-sensitive adhesive sheet according to claim 1, wherein the (meth)acrylic polymer further comprises, as another monomeric component constituting the (meth)acrylic polymer, an alicyclic monomer.

7. The release film-supported pressure-sensitive adhesive sheet according to claim 6, wherein the alicyclic monomer accounts for 20% by weight to 50% by weight of all monomeric components.

8. The release film-supported pressure-sensitive adhesive sheet according to claim 1, wherein the (meth)acrylic polymer further comprises, as another monomeric component constituting the (meth)acrylic polymer, a polyfunctional monomer, wherein the polyfunctional monomer accounts for 3% by weight or less of all monomeric components.

9. The release film-supported pressure-sensitive adhesive sheet according to claim 1, wherein the (meth)acrylic polymer is a product of UV polymerization of the monomeric components.

10. The release film-supported pressure-sensitive adhesive sheet according to claim 1, wherein the second face is a second adhesive face.

11. The release film-supported pressure-sensitive adhesive sheet according to claim 10, wherein the second adhesive face has a 10-point mean roughness of 2000 nm or less.

12. The release film-supported pressure-sensitive adhesive sheet according to claim 11, wherein the 10-point mean roughness of the second adhesive face is 1000 nm or less.

13. The release film-supported pressure-sensitive adhesive sheet according to claim 10, wherein the first adhesive face has a 10-point mean roughness and the second adhesive face has a 10-point mean roughness, with either one of the two being 500 nm or less.

14. The release film-supported pressure-sensitive adhesive sheet according to claim 10, wherein the second adhesive face is formed of a second surface of the pressure-sensitive adhesive layer.

15. The release film-supported pressure-sensitive adhesive sheet according to claim 1, wherein the second face is a second adhesive face, and further comprising a second release film placed on the second adhesive face.

16. The release film-supported pressure-sensitive adhesive sheet according to claim 1, wherein the second face is a second adhesive face, and further comprising a second release film placed on the second adhesive face, and the second release film has a 10-point mean roughness of 1000 nm or less.

* * * * *